United States Patent
Rudorff et al.

(10) Patent No.: US 8,314,592 B2
(45) Date of Patent: Nov. 20, 2012

(54) ENERGY STORAGE UNIT

(75) Inventors: Axel Rudorff, Berlin (DE); Manfred Malik, Penzberg (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 776 days.

(21) Appl. No.: 11/996,634

(22) PCT Filed: Jul. 24, 2006

(86) PCT No.: PCT/DE2006/001292
§ 371 (c)(1),
(2), (4) Date: Jan. 24, 2008

(87) PCT Pub. No.: WO2007/012315
PCT Pub. Date: Feb. 1, 2007

(65) Prior Publication Data
US 2008/0211457 A1    Sep. 4, 2008

(30) Foreign Application Priority Data
Jul. 25, 2005    (DE) .......................... 10 2005 034 588

(51) Int. Cl.
*H02J 7/00*    (2006.01)
*H02J 7/04*    (2006.01)
(52) U.S. Cl. ........ 320/116; 320/151; 320/132; 320/124; 320/119
(58) Field of Classification Search .................. 320/116, 320/118, 119, 120, 104, 121, 124, 125, 127, 320/132, 134, 136, 148, 149, 150, 151, 152, 320/153, 154
See application file for complete search history.

(56) References Cited

U.S. PATENT DOCUMENTS

| | | | |
|---|---|---|---|
| 5,498,950 A * | 3/1996 | Ouwerkerk | 320/119 |
| 5,617,004 A | 4/1997 | Kaneko | |
| 5,644,209 A * | 7/1997 | Chabbert et al. | 320/122 |
| 5,952,815 A * | 9/1999 | Rouillard et al. | 320/116 |
| 6,081,095 A * | 6/2000 | Tamura et al. | 320/118 |
| 6,204,630 B1 * | 3/2001 | James | 320/104 |
| 6,664,766 B2 * | 12/2003 | Desprez et al. | 320/167 |
| 7,091,695 B2 * | 8/2006 | Miyazaki et al. | 320/116 |
| 7,248,020 B2 * | 7/2007 | Hidaka et al. | 320/134 |

(Continued)

FOREIGN PATENT DOCUMENTS
EP    1083646    3/2001
(Continued)

*Primary Examiner* — Edward Tso
*Assistant Examiner* — Alexis Boateng

(57) ABSTRACT

An energy storage unit has several storage elements (2, 2') which are switched in series and a charge redistribution circuit (6, 6'). The latter is installed in such a manner that the voltage of the storage element ($U_{ELn}$, $U_{Eln}'$) is measured and compared with a voltage threshold value ($U_{THRn}$, $U_{THR}$, $U_{THRn}'$, $U_{THR}'$). When the threshold value is exceeded by a storage element, it removes charge from said storage element, thus reducing its voltage. According to one aspect, a storage-related temperature determination is conducted, and the threshold value is set variably in dependence on the determined temperature ($T_n$, T) in such a manner that it is reduced as the temperature increases. According to a further aspect, the threshold value is set variably in dependence on the current vehicle operating state, in such a manner that it is set higher for relatively brief periods of time when the storage or removal requirement is relatively high. According to an additional further aspect, the threshold value is set lower for storage elements with a relatively advanced age than for those with a less advanced age.

10 Claims, 11 Drawing Sheets

U.S. PATENT DOCUMENTS

| | | | |
|---|---|---|---|
| 7,453,237 B2 * | 11/2008 | Yamamoto | 320/118 |
| 7,615,966 B2 * | 11/2009 | Houldsworth et al. | 320/132 |
| 2002/0190692 A1 * | 12/2002 | Marten | 320/116 |
| 2004/0027092 A1 * | 2/2004 | Patel et al. | 320/119 |
| 2006/0087287 A1 * | 4/2006 | Thrap | 320/118 |
| 2006/0097696 A1 * | 5/2006 | Studyvin et al. | 320/116 |
| 2006/0103351 A1 * | 5/2006 | Tanigawa et al. | 320/118 |

FOREIGN PATENT DOCUMENTS

| | | |
|---|---|---|
| EP | 1247979 | 10/2002 |
| EP | 1283580 | 2/2003 |
| JP | 08-182203 | 7/1996 |
| JP | 2000197279 | 7/2000 |
| JP | 2003333763 | 11/2003 |

* cited by examiner

ENERGY STORAGE UNIT

FIELD OF THE INVENTION

The invention relates in general to the storage of electrical energy, and for example to an energy storage unit with several storage elements which are switched in series and with a charge redistribution circuit. The energy storage unit is installed in such a manner that the voltage of the storage element is measured and is compared with a voltage threshold value, wherein, when a storage element exceeds the voltage threshold value, the charge redistribution circuit removes charge from said storage element, thus reducing its voltage.

BACKGROUND OF THE INVENTION

Storage units for electrical energy are usually constructed from individual storage elements. The nominal operating voltage of these storage elements is usually relatively low, e.g. in the range of between 2 and 2.5 V with double-layer capacitors. For most applications, however, a far higher operating voltage of the energy storage unit is required. For example, the electric drives of hybrid motor vehicles are operated at between 48 and 300 V, depending on the type, so that an energy storage unit designed to feed a drive of this type needs to have a correspondingly high operating voltage. In order to attain this high voltage, with energy storage units, a corresponding number of storage elements are typically switched in series. For example, a 48 V energy storage unit can be created by a series connection of 20 double-layer capacitors with an operating voltage of approx. 2.4 V.

It is now known that the working life of energy storage units of this type is significantly reduced by a lack of homogeneity in the charge state of the individual storage elements (for example from H. Schmidt et al. "The charge equalizer—a new system to extend battery lifetime in photovoltaic systems, U.P.S. and electric vehicles", International Telecommunications Energy Conference, Intelec, Paris, 27 to 30 Sep. 1993, IEEE vol. 2, Conf. 15, p. 146-151). Previously, it was assumed that with a series connection of individual storage elements, all these elements would have identical properties, and would constantly be in the same charge state. In actual fact, the storage elements—which are nominally the same—generally deviate slightly from each other in terms of their nominal values (such as capacity and self-discharging rate). With a simple series connection, differences of this nature can on the one hand, during discharging processes, lead to total discharges or even to inverse charges of storage elements with a low capacity, while on the other hand, during charging processes, lead to excess charging of storage elements which are fully charged prematurely. This behaviour is generally divergent; in other words, even small differences between the individual storage elements lead during the course of time to the developments described above when only a sufficiently large number of charging/discharging cycles are executed. The developments described above initially lead to damage or failure of the affected storage element and can finally, in a type of chain reaction, cause the premature failure of the entire energy storage unit.

In order to avoid effects of this nature (which are in practise unavoidable) which are caused by differences between individual storage elements, several authors have already suggested different methods with which a symmeterisation of the charge state of the individual storage elements is produced, e.g. Schmidt et al. in the aforementioned conference paper, and in EP 0 432 639 A2, N. Kutkut et al. in "Dynamic equalization techniques for series battery stacks", Telecommunications Energy Conference 1996 (Intelec), Boston, 6 to 10 Oct. 1996, IEEE 0-7803-3507-4/96, p. 514-521, and Ridder in EP 1 283 580 A2. These suggestions are all based on the idea that the voltage of the storage elements should be monitored, and that charge should be removed from storage elements with a higher charge (wherein with some suggestions, charge is removed from all storage elements, with more charge being removed from storage elements with a higher charge than from those with a low charge). While with earlier suggestions (which are described for example by Schmidt in the aforementioned conference paper) the energy removed from the more highly charged storage elements was dissipated in heat resistances, according to more recent suggestions, the removed charge is fed back to the energy storage unit (i.e. in effect to the other storage elements). A re-storage of this nature is more effective, since with this method, the only energy loss is that which arises as a result of the re-storage process, rather than the entire quantity of re-stored energy. With these more recent suggestions, the working life of energy storage units of the type named above can be considerably extended, with a relatively high degree of effectiveness.

The symmetry connection described by Ridder in EP 1 283 580 A2 is constructed of charge removal connections which are assigned to the individual storage elements, and which operate essentially autonomously. An upstream control unit determines the voltage thresholds for the charge removal connections (EP 1 283 580 A2, paragraph [0027]).

SUMMARY OF THE INVENTION

The invention relates according to a first aspect to an energy storage unit with several storage elements which are switched in series, and to a charge redistribution circuit. The energy storage unit is installed in such a manner that the voltage of the storage elements is measured and is compared with a voltage threshold value. When the voltage threshold value is exceeded by a storage element, the charge redistribution circuit removes charge from this storage element, thus reducing its voltage. In addition, a storage-related temperature determination is conducted, and the voltage threshold value is set variably in dependence on the determined temperature in such a manner that as the temperature increases, the voltage threshold value is reduced.

A further aspect relates to an energy storage unit for a motor vehicle which is equipped with an electric drive or an electric hybrid drive, with several storage elements which are switched in series and a charge redistribution circuit. The energy storage unit is installed in such a manner that the voltage of the storage elements is measured and is compared with a voltage threshold value. When the voltage threshold value is exceeded by a storage element, the charge redistribution circuit removes charge from this storage element, thus reducing its voltage. The voltage threshold value is set variably in dependence on the current operating state of the motor vehicle in such a manner that the threshold value for relatively brief periods of time is set higher when the storage or removal requirement is relatively high.

A further aspect relates to an energy storage unit with several storage elements which are switched in series and a charge redistribution circuit. The storage elements can be of different ages. The energy storage unit is installed in such a manner that the voltage of the storage elements is measured and is compared with a voltage threshold value. When the voltage threshold value is exceeded by a storage element, the charge redistribution circuit removes charge from this storage element, thus reducing its voltage. The voltage threshold value is set lower for relatively old storage elements than for storage elements which are newer.

Further features are described in the disclosed devices, or can be taken by readers familiar in the art from the following detailed description of embodiments, and from the appended drawings.

BRIEF DESCRIPTION OF THE DRAWINGS

Embodiments of the invention will now be described using examples, and with reference to the appended drawing, in which.

In the figures, parts which have the same function are assigned the same or similar reference numerals.

DESCRIPTION OF THE PREFERRED EMBODIMENTS

Figure 1:
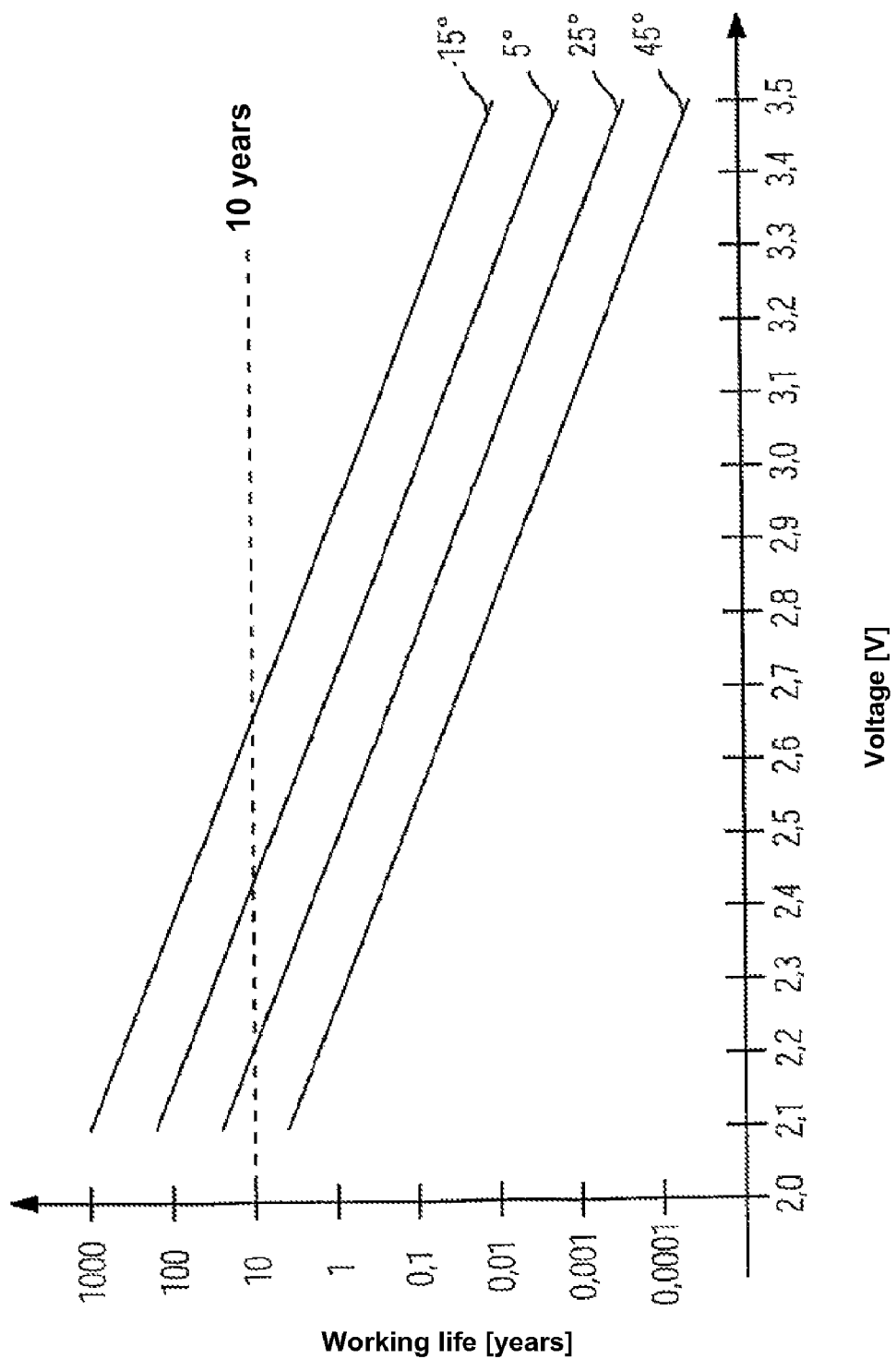
FIG. 1 shows a working life voltage diagram of an exemplary storage element (e.g. a double-layer capacitor)

Before the working life voltage diagram of an exemplary double-layer capacitor as shown in FIG. 1 is explained, a few comments will be made with reference to the preferred embodiments.

These relate to an energy storage unit with several storage elements which are switched in series, and which are galvanic cells, capacitors, double-layer capacitors etc. The reason for switching the storage elements in series is that, as has been explained in the introduction, the energy storage unit—when regarded as a whole—is required to deliver a far greater operating voltage than the nominal operating voltage of an individual storage element. For example, an energy storage unit with 20 2.4 V storage elements which are switched in series delivers a voltage of approx. 48 V. With certain embodiments, an individual storage element can be formed as a result of the parallel switching of several sub-elements; these are referred to as a "storage element" regardless of their inner structure.

As has been explained in the introduction, with a pure series circuit (without a charge compensation between the individual storage elements) the differences between the individual storage elements which cannot be avoided lead to unequal charge states. With the embodiments, a charge redistribution circuit is therefore provided, which is capable of removing charge from individual storage elements which are switched in series. Charge is removed from a storage element when the voltage of the storage element exceeds a voltage threshold value. For this purpose, the charge redistribution circuit continuously measures the voltage of the storage element, compares it with the voltage threshold value and triggers the charge removal when the measured voltage of the storage element exceeds the voltage threshold value.

As is described in greater detail below, with some embodiments, this value is a uniform voltage value for all storage elements in the energy storage unit, while with other embodiments, each storage element is assigned an individual voltage threshold value which can differ from the voltage threshold values of the other storage elements (but which naturally does not have to differ from them in individual cases). With further embodiments, a middle way between these two extremes is provided, in which groups of storage elements (e.g. storage element pairs) are respectively assigned their own voltage threshold value.

The different embodiments share the idea that the uniform threshold value or the individual threshold values are not determined in such a manner that they cannot be changed, but are set variably in dependence on one or more parameters. The dependence parameters can for example be: (i) the storage element temperature (ii) the operating state of the motor vehicle, and (iii) the age of the storage element. With some embodiments, only one of these dependences (i.e. (i), (ii) or (iii) for example) is realised, while with other embodiments, two of these dependences are combined (i.e. (i) and (ii), (i) and (iii), or (ii) and (iii) for example); with a further embodiment, all three dependences are finally realised together (i.e. (i) and (ii) and (iii)).

These different measures for variably setting the threshold value are all based on the fact that with different storage element types, the working life of the storage element depends strongly on the voltage with which the storage element is operated. The higher the operating voltage, the faster the ageing process of the storage element. For example, with a double-layer capacitor, the rate at which the electrolyte decomposes is higher in relation to the level of operating voltage of the double-layer capacitor. In order to increase the length of working life, it would naturally be possible to set the voltage threshold value to a relatively low value in such a manner that it could not be changed. However, the price for this would be an overall reduction in storage capacity of the energy storage unit. As a result of the measure taken here of variably setting voltage threshold values, a relatively long working life of the energy storage unit is attained on the one hand, while without generally (i.e. in all operating states or for all storage elements equally) reducing the storage capacity.

In general, the energy storage unit is better able to absorb energy when the voltage threshold value(s) are increased. Lowering the voltage thresholds when the storage unit is charged either only leads to a re-storage of energy from storage elements which have a particularly high voltage level (as long as the other storage elements are still able to absorb energy), or to the removal of stored energy from the entire energy storage unit, for example in the form of lost heat from the charge redistribution circuit (when the other storage elements are no longer able to absorb energy).

Measure (i): Varying the Threshold Value Depending on the Temperature

With a first group of embodiments, the voltage threshold value is set in dependence on the storage element temperature. This is based on the fact that except for the voltage, the storage element working life depends to a large extent on the storage element temperature. With a capacitor-type storage element, it is not a high voltage alone which leads to a rapid decomposition of the electrolyte, but a higher voltage at a higher temperature. The voltage and the temperature are complementary influencing variables in relation to working life. At a low storage element temperature, such a storage element can therefore be operated at a relatively high voltage, and vice-versa. With the embodiments of this group, in order to make use of this complementarity, a storage-related temperature determination is conducted, and the voltage threshold value is set variably in dependence on the determined temperature in such a manner that as the temperature increases, the voltage threshold value is reduced.

The temperature of the storage elements is determined by external and internal heat sources and heat sinks. An external heat source or heat sink is the ambient environment (depending on whether the ambient temperature lies below or above the storage element temperature, wherein the ambient temperature can vary, e.g. depending on the season). Usually, the ambient environment is a heat sink, e.g. whereby the energy storage unit is cooled by the ambient air (with some embodiments, a cooling fan is provided in order to cool the energy storage unit with ambient air). In addition, further external heat sources can if appropriate be arranged close to the energy storage unit. If for example the energy storage unit is installed in the engine area of a hybrid motor vehicle, it can for example obtain waste heat from the combustion engine (e.g. via heat conduction, convection or radiation), and can as a result heat up in dependence on the combustion engine temperature. The essentially internal heat source forms the heat losses which arise in the storage elements due to their internal resistance. Overall, the temperature of the energy storage unit can vary within a relatively wide temperature range (up to 100° C.), depending on the ambient temperature, the operating state of the motor vehicle and the dissipated energy (depending on the amount of energy which has been removed or stored).

With some of the embodiments, the storage unit-related temperature is determined by means of temperature measurement. For this purpose, temperature sensors are provided, for example, which measure the current operating temperature of each individual storage element. With other embodiments, groups of storage elements, such as storage element pairs, are together respectively equipped with a temperature sensor, which measures approximately the average temperature of the storage elements in its group. With a further embodiment, a temperature sensor is arranged on the energy storage unit in such a manner that it measures approximately the average temperature of all storage elements.

With other embodiments, the temperature is by contrast determined not by means of temperature measurement, but a conclusion regarding the temperature is made from other (measured or otherwise determined) values. For example, from the (measured) ambient temperature, the (measured) cooling water temperature of the combustion engine and the (e.g. also determined by means of measurement) current flow through the energy storage unit, a conclusion is made regarding the current temperature in the energy storage unit.

With some embodiments, as has already been mentioned above, a uniform voltage threshold value is used for the storage elements in the energy storage unit. This uniform voltage threshold value is set variably, in dependence on the determined temperature, wherein this represents the approximate average temperature of the different storage elements. With some embodiments, the temperatures of the individual storage elements are measured and the average temperature is calculated by averaging these temperature measurement values. With other embodiments by contrast, an average temperature is measure directly, e.g. by measuring the temperature on a housing of the energy storage unit which is in heat conducting contact with the storage elements, and the temperature of which corresponds approximately to the average storage element temperature.

With other embodiments, as has also already been mentioned above, individual storage elements, or groups of storage elements, are assigned individual voltage threshold values. These individual voltage threshold values are set variably for the individual storage elements or storage element groups, in dependence on the temperatures determined individually for these storage elements or storage element groups. As a result, a voltage reduction is systematically created with those storage elements which due to a particular external heat feed (e.g. due to a particular proximity to the combustion engine) and/or due to a particular internal heat generation (e.g. due to an internal resistance which lies above the average level) have a higher temperature than the other storage elements. A voltage threshold setting of this nature which is conducted for the individual storage elements in dependence on the individual storage element temperature has a homogenising effect on the ageing of the individual storage elements, and is thus particularly advantageous for the working life of the energy storage unit overall.

Measure (ii): Variation of the Threshold Value in Dependence on the Vehicle Operating State A second group of embodiments relates to situations when the motor vehicle which is equipped with an electric drive or with a combustion engine electric hybrid drive is equipped with the energy storage unit. With this second group, the voltage threshold value is set in dependence on the operating state of the vehicle, in such a manner that the threshold value is set higher for relatively brief periods of time with a relatively high energy storage or energy removal requirement than at other times. This measure is based on the assumption that for relatively brief periods of time, faster ageing can be acceptable, since time periods of this nature only make a relatively minor contribution to the reduction in working life due to their low proportional share of the overall working life. On the other hand, as a result of such a measure, the effective storage capacity of the energy storage unit is significantly increased.

With the embodiments in the second group, the operating states on which the threshold value setting depends can for example be one or more of the following states:

Drive mode/operation standstill: With some embodiments, the energy storage unit remains in a charged state even when the motor vehicle is at a standstill. The voltage threshold value is set to a lower value during operational standstill of the vehicle than when in drive mode. Taking into account the fact that for example a standard, privately used car is typically at a standstill for 20 times as long as it is in drive mode, the reduction in voltage significantly extends working life when the vehicle is at a standstill.

Dynamic mode/undynamic mode: With a "dynamic" mode, i.e. with a mode with more frequently changing vehicle states, such as frequent acceleration and subsequent braking, with an electric vehicle or with an electric hybrid vehicle with electric braking and brake energy recovery, there is a relatively high requirement for feeding the energy gained during the electric braking process into the energy storage unit. The energy stored in each case then usually remains only relatively briefly in the energy storage unit, since it is then immediately removed again from the storage unit for an electric acceleration or acceleration support during an acceleration procedure which frequently follows soon afterwards. Accordingly, with some embodiments, in dynamic mode, i.e. in a mode in which the vehicle states change more frequently (e.g. when driving on urban roads), the voltage threshold value is set higher than for undynamic mode, i.e. a mode with a more uniform vehicle state (e.g. when driving on the motorway).

Regenerative braking/no regenerative braking: Regardless of whether the current operating state is a dynamic state (urban traffic) or an undynamic state (motorway traffic), in principle, there is a need for storing a relatively large quantity of energy with every larger electric regenerative braking process. For this reason, with some embodiments, with electric regenerative braking, the voltage threshold value is set at a high level. This high level setting is maintained over a certain period of time after the regenerative braking; only then is the threshold value reduced again. Frequently, the stored braking energy is immediately again removed from the storage unit for other purposes during this time period, e.g. for accelerating the vehicle. In this way, as a result of this brief increase in threshold, a larger quantity of braking energy can be recuperated.

Overall, measure (ii) thus enables a more efficient utilisation of the energy storage unit when used as a braking energy and drive energy storage unit in an electric motor vehicle or electric hybrid motor vehicle, but without causing a significant reduction in the working life of the energy storage unit.

Measure (iii): Variation of the Threshold Value in Dependence on the Age of the Storage Element.

While with the embodiments according to measures (i) and (ii), it is possible (although not absolutely necessary) to treat the storage elements in the same way and to set a uniform voltage threshold value variably for all storage elements together, measure (iii) relates to the non-uniform treatment of the storage elements for the purpose of equalising different storage element ages. The working life of an energy storage unit which is constructed from a large number of storage elements which are switched in series essentially corresponds to the working life of the shortest lived storage element. A deceleration of the ageing process of a storage element which is already older than the average age at the cost of the storage elements which have a longer working life remaining thus extends the overall working life of the energy storage unit. A selective deceleration of the ageing process for individual storage elements is triggered in a third group of embodiments by means of the fact that for the affected storage elements, the voltage threshold value is set lower than for the other storage elements.

There are different indicators for the age of a storage element. One of these indicators is the storage element capacity, for example, since this falls as the age of the storage element increases. The capacity is known to be defined as the charge stored in the storage element for each voltage unit. With some embodiments, therefore, the current flowing through the energy storage unit is measured in order to measure the age of a storage element (or, alternatively, a current of a known value is impressed). The change in the stored charge is determined from the current by means of integration. The resulting change to the voltage which is reduced on the storage element is measured. Finally, the capacity of the storage element is determined by calculating the ratio between the change in charge and the change in voltage. A conclusion is made regarding the age of the storage element using this information. On the basis of the determined age, the voltage threshold value for storage elements which are older is set lower than for those which are not as old, with the aim of achieving approximately the same "end of working life timepoint" for all storage elements in the energy storage unit. In individual cases, this measure can lead to a significant increase in the overall working life of the energy storage unit, without having a significantly negative impact on its capacity.

Overlaying the Measures Described Above

As has already been mentioned above, with some embodiments, the three measures described can be used together; with some embodiments, however, there is a sub-combination of two of the measures respectively. For example, a temperature adjustment of the voltage threshold value (either a uniform adjustment, or an adjustment for individual storage elements) can be overlaid by an adjustment (which is uniform for all storage elements) which depends on the motor vehicle operating state. These two dependencies can in turn be overlaid by individual threshold values which are dependent on age. Overlaying procedures of this type can be deviations from an average threshold value, for example, which are added for each storage element. For example, let us assume that an average nominal voltage threshold value is 2.4 V. Due to a relatively high temperature of the energy storage unit which is currently measured, this threshold value is reduced by 0.3 V. The current operating state of the motor vehicle (dynamic operation, as opposed to the undynamic operation which is regarded as normal) would however allow a voltage threshold value which is currently 0.1 V higher. Of two storage elements observed, one is relatively "young", so that no reduction of the threshold value is required in order to decelerate the ageing process. For this storage element in this example, a threshold value of 2.2 V is set. However, with another observed storage element, the ageing process in comparison with the other storage elements is so far advanced that for this storage element, the threshold value is reduced by 0.1 V in order to decelerate the ageing process. For this storage element in this example, a threshold value of 2.1 V is therefore set.

While the operating state of the vehicle and the temperature of the energy storage unit can change within seconds to minutes, the age of a storage element is a value which changes relatively slowly (e.g. on a timescale of days to months). Accordingly, with some of the embodiments, the temperature or vehicle operating state is determined and a corresponding temperature-dependent or vehicle operating state-dependent adjustment of the threshold value is made relatively frequently (e.g. with a period in the region of seconds to minutes), while the determination of the age of the individual cells and a corresponding age-dependent adjustment of the threshold value is less frequent (e.g. with a period in the region of days to months).

Energy Removal from Storage Elements Which Exceed the Threshold Value and from the Overall Energy Storage Unit With some embodiments, the energy which is removed from a storage element due to the fact that it exceeds the threshold value is dissipated, e.g. it is heated by means of a loss resistance. With other embodiments, which are in general more effective, the charge which is removed from a storage element is by contrast fed to one or more other storage elements in the energy storage unit. Due to the tendency mentioned in the introduction to an uneven charge, these other storage elements are still capable of absorbing energy without at the same time exceeding their voltage threshold value when they are charged.

It can of course be the case that so many (or possibly all) storage elements exceed the threshold value that the remaining storage elements (when present) no longer have sufficient absorption capacity for the charge to be removed. With some embodiments, it is provided for cases such as this that a charging/discharging control device triggers the removal of energy from the overall energy storage unit (the charging/discharging control device also receives information regarding e.g. the temperature and/or the operating state, in order to also charge and discharge the energy storage unit overall in dependence on the temperature and/or the operating state, wherein for this purpose, a generally somewhat lower voltage is provided for the individual storage elements than the voltage threshold value, in order to prevent interference with the threshold value-controlled charge equalisation processes). The removed energy can for example be fed to a consumer or heated by means of a resistance (dissipated). With some embodiments, the charge redistribution circuit itself can also play an energy dissipation role. For this purpose, with some embodiments, heat resistances are provided in the charge redistribution circuit; with other embodiments, the energy dissipation is based on losses which occur when the charge is redistributed in the charge redistribution circuit. These losses remove energy from the overall energy storage unit in the form of heat. When the overall energy level in the energy storage unit is too high, with the latter embodiments, therefore, the charge is redistributed continuously in order to gradually reduce the stored energy, until finally, the voltage of all storage elements falls below the voltage threshold value.

Exemplary Storage Elements

With some embodiments, the storage elements are galvanic elements, while with other embodiments, however, they are capacitors, and with some of these embodiments, they are double-layer capacitors (as has already been mentioned above).

Galvanic elements store the energy in a chemical form. In this way, relatively high energy densities can be achieved. The conversion of chemical energy into electric energy entails certain losses, and is generally somewhat slower than for example with (double-layer) capacitors, so that in comparison with these, in general lower capacities can be removed in relation to the overall energy quantity which can be stored. In addition, the conversion speed is generally somewhat reduced as the temperature sinks, and furthermore, the working life of electrochemical batteries of this type tends to be limited. At the same time, with different applications, the need for a higher energy density takes priority, so that with some embodiments, galvanic storage elements such as nickel metal hydride cells or lithium ion cells are used.

Capacitors store the energy directly in electric form, so that it can be removed almost without loss or delay, and as often as is required. However, the energy density with standard capacitors is relatively low (typically 0.01 Wh/kg with electrolyte capacitors). Double-layer capacitors have the advantages of standard capacitors (almost loss-free, fast and frequent dischargeability), but achieve far higher energy densities. These are for example in the order of one or two measures above those of aluminium electrolyte capacitors. With these capacitors, the storage mechanism is based on the movement of ions in the electric field (and not only on the polarisation of ions as with standard capacitors with dielectric). An electrochemical double layer (hence the name "double-layer capacitor") is charged/discharged. This layer comprises two phases: For example, electrically conducting carbon on the one side, and ions which are dissolved in a solution on the other side. While charging and discharging, the ions are attracted or repelled by the polarised carbon electrodes. Since the distance between the charge carriers is generally only a few nanometers, and the surface of such carbon materials is very large, relatively high capacities can be achieved with a low volume (see for example T. Dietrich: UltraCaps—Power für innovative Automobilapplikationen, in A. Krappel (publisher): Kurbelwellenstartgenerator (KSG)—Basis für zükunftige Fahrzeugkonzepte ("Crankshaft start generator—the basis for future vehicle concepts"), 2nd edition, published by Expert 2000, p. 202-207—comment: "UltraCap" is a brand name for the double-layer capacitors sold by Epcos, and is sometimes used in specialist literature as a general name for double-layer capacitors).

FIG. 1: Working Life as a Function of Voltage and Temperature

With reference to FIG. 1, the working life of an exemplary storage element used with embodiments of the energy storage unit, here a typical double-layer capacitor, is shown as a function of the voltage of the storage element for four different exemplary temperatures. The four working life voltage curves shown all share the fact that the working life is (exponentially) increased as the voltage is reduced, and that it is also increased as the temperature is reduced; thus, for example, a reduction in temperature by approximately 25° C. corresponds to an increase in working life by ten times.

With some embodiments, on the basis of the conditions shown in FIG. 1, the operating voltage of the storage elements is maintained at a sufficiently low level by correspondingly setting the voltage threshold value, in dependence on the current temperature, in order to achieve a specific working life of the storage elements. In FIG. 1, for example, a 10-year period has been drawn in as a broken line, which shows that in order to achieve a working life of ten years at −15° C., a voltage of 2.65 V must be maintained, while at higher temperatures, such as 5° C., 25° C. or 45° C., the voltage must be reduced to 2.45 V or 2.25 V or 2.05 V.

Figure 2:
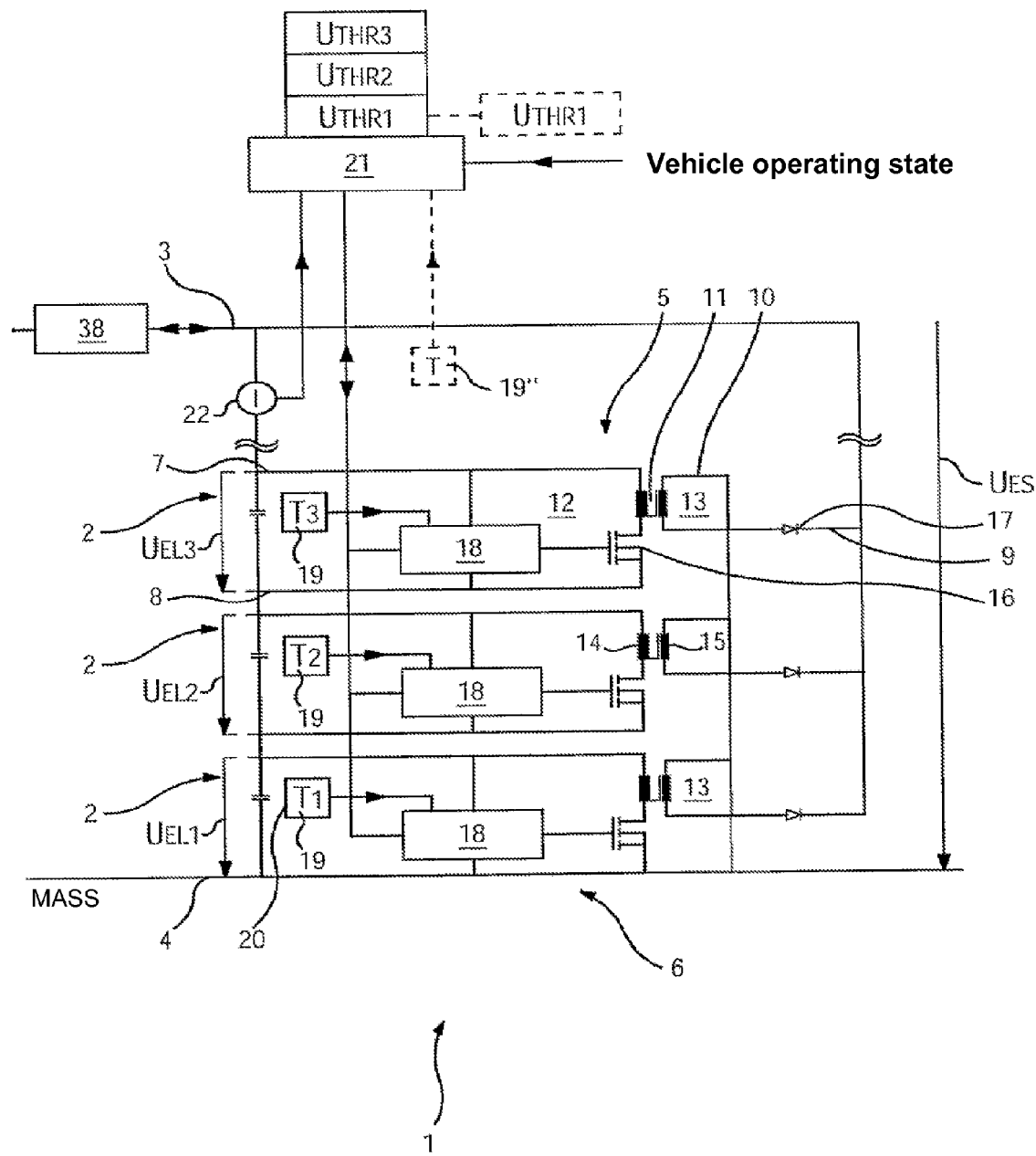
FIG. 2 shows a circuit diagram of an embodiment of an energy storage unit with several storage elements which are switched in series and with a charge redistribution circuit and an upstream control unit.

FIG. 2: Charge Redistribution Circuit with Individual Storage Elements

The charge redistribution circuit 1 according to FIG. 2 comprises several storage elements 2 which are switched in series. With the present embodiment, these are double-layer capacitors which, as will be explained in greater detail below, are operated with voltages in the range of approximately 2.4 V. In order to achieve an overall voltage UES of the energy storage unit 1 of approximately 48 V, 20 storage elements 2 are thus switched in series, for example. The energy storage unit 1 has two connections outwards which guide the capacity current: a plus connection 3 and a connection to earth 4. Via these connections 3, 4, the current flow with which the energy storage unit 1 is charged from an external source, or is discharged externally.

With the embodiments shown in FIG. 2, each storage element 2 is assigned a charge redistribution unit 5; the charge redistribution units 5 together form a charge redistribution circuit 6. The charge redistribution units 5 each have two input connections 7, 8 and two output connections 9, 10. Of the input connections 7, 8, in each case one (7) is connected with the plus terminal and the other (8) is connected with the minus terminal of the assigned storage element 2. Of the output connections 9, 10, the one which has the higher potential (9) is in each case connected with the plus connection 3 of the energy storage unit 1, and the one which has the lower potential (10) is connected with earth 4. The charge redistribution units 5 are therefore connected on their output side in parallel with the series connection of the storage elements 2.

The charge redistribution units 5 each comprise a transformer 11 which subdivides the charge redistribution units 5 into a primary part 12 with the input connections 7, 8 and a secondary part 13 with the output connections 9, 10. The transformer 11 does not need to transmit voltage, and can thus have a transmission ratio of one. With the example shown in FIG. 2, the primary winding 14 and the secondary winding 15 have a different polarity, so that on the primary and secondary side, high and low voltage levels lie opposite each other in each case.

The primary part 12 of the charge redistribution units 5 is formed from a series connection of the primary winding 14 and a power switch 16, which can for example be a bipolar or field effect power transistor (here, a power MOSFET). The secondary part 13 is formed from a series connection of the secondary winding 15 and a diode 17, which allows current to flow through to the plus connection 3 of the series connection of the storage elements 2.

The charge redistribution unit 5 also comprises a local control unit 18, which delivers the switching signals for the power switch 16. In the embodiment shown in FIG. 2, it is connected with the input connections 7 and 8, in order to measure the voltage UEL of the respectively assigned storage element 2.

With the embodiment shown in FIG. 2, the storage elements 2 are each assigned a temperature sensor 19. This continuously measures the current temperature $T_n$ of the corresponding storage element 2, and supplies the corresponding storage unit 18 continuously with a signal which represents the measured temperature (wherein "n" is the number of the storage element 2). The temperature sensor 19 is for example arranged so that it is coupled to the housing of the respective storage element 2 in such a manner that it conducts heat.

The local control units 18 are connected via control lines 20 (for example in the form of a serial bus) with an upstream control unit 21. They provide the upstream control unit 21 via the control lines 20 with local information, such as the measured voltage $U_{ELn}$ which is currently decreasing on the corresponding storage element 2, together with the measured current temperature $T_n$ of this storage element 2 (wherein "n" is in turn the number of the storage element 2). In the other direction, the upstream control unit 21 informs the local control units 18 via the control lines 20 of voltage threshold values. With some embodiments, these are individual threshold values $U_{THRn}$ for the individual charge redistribution units 5 (shown in FIG. 2 with continuous lines); with other embodiments, however, the upstream control unit 21 transmits a uniform threshold value $U_{THR}$ for all charge redistribution units 5 (shown as a broken line in FIG. 2).

The charge redistribution functions in the following manner: When the measured current voltage $U_{ELn}$ of one or more of the storage elements 2 lies above the voltage threshold value $U_{THRn}$ or $U_{THR}$ specified by the upstream control unit 21, the affected local control unit 18 causes charge to be removed from the affected storage element 2 until this voltage has fallen below the voltage threshold value $U_{THRn}$ or $U_{THR}$ (with some embodiments, a hysteresis is here provided, i.e. the charge is removed until the voltage $U_{ELn}$ has fallen below a second threshold, which lies for example at a fixed level below the voltage threshold value $U_{THRn}$ or $U_{THR}$). For this purpose, the local control unit 18 cycles the power switch 16. When the power switch 16 is closed, current flows in the primary part 12, so that energy is fed into the transformer 11. When it is open, a voltage is induced on the output connections 9, 10, which is far greater than the voltage $U_{ELn}$ on the primary side, and is thus also greater than the voltage $U_{SP}$ of the series connection of the storage elements 2. In other words, when the switch 16 is opened, the energy stored in the transformer 11 is emitted on the secondary side when the voltage is increased. The energy which is removed from the individual storage element 2—except for the energy which is converted into lost heat in the charge redistribution circuit 6—fed back into the series connection of the storage elements 2 after the voltage has been increased. In general, the charge redistribution units 5 form what are known as primary cycled switching regulators.

With some embodiments, instead of the individual temperature sensor 19, a shared temperature sensor 19" is provided (shown with a broken line in FIG. 2), which for example is installed in a heat conducting coupling arrangement with an overall housing of the energy storage unit 1, and which continuously measures the shared temperature T of the storage elements 2 and reports to the upstream control unit 21.

With some embodiments, in the charging/discharging circuit of the energy storage unit 1, a current measuring device 22 is provided which sends the measurement values for the current to the upstream control unit 21. With its knowledge of the charging/discharging current during a charging or discharging process, together with its knowledge of the resulting changes in the voltages $U_{ELn}$ of the individual storage units 2, the upstream control unit 21 is capable of determining the capacity of the individual storage elements 2.

With some embodiments, in which the energy storage unit 1 acts as a drive and brake energy storage unit of an electric motor vehicle or electric hybrid vehicle, the upstream control unit 21 receives signals which represent the current vehicle operating state (or changes to the vehicle operating state). These operating state signals show for example whether the vehicle is currently at a standstill or in operation, whether the operation involves frequent or more infrequent changes to driving states, and/or whether an electric regenerative braking process is currently being executed.

As will be described in greater detail below, the upstream control unit 21 calculates from the aforementioned input value(s) (individual temperatures $T_n$ or shared temperature T, charging/discharging current and thus the resulting change in the voltages $U_{ELn}$, and/or information regarding the vehicle operating state) the individual voltage threshold values $U_{THRn}$ or, with some embodiments, a uniform voltage threshold value $U_{THR}$, and transfers this/these to the local control units 18, which use the threshold value(s) as a basis for their charge removal activity (described above).

FIG. 3: Charge Redistribution Circuit with Groups of Storage Elements

Figure 3A:
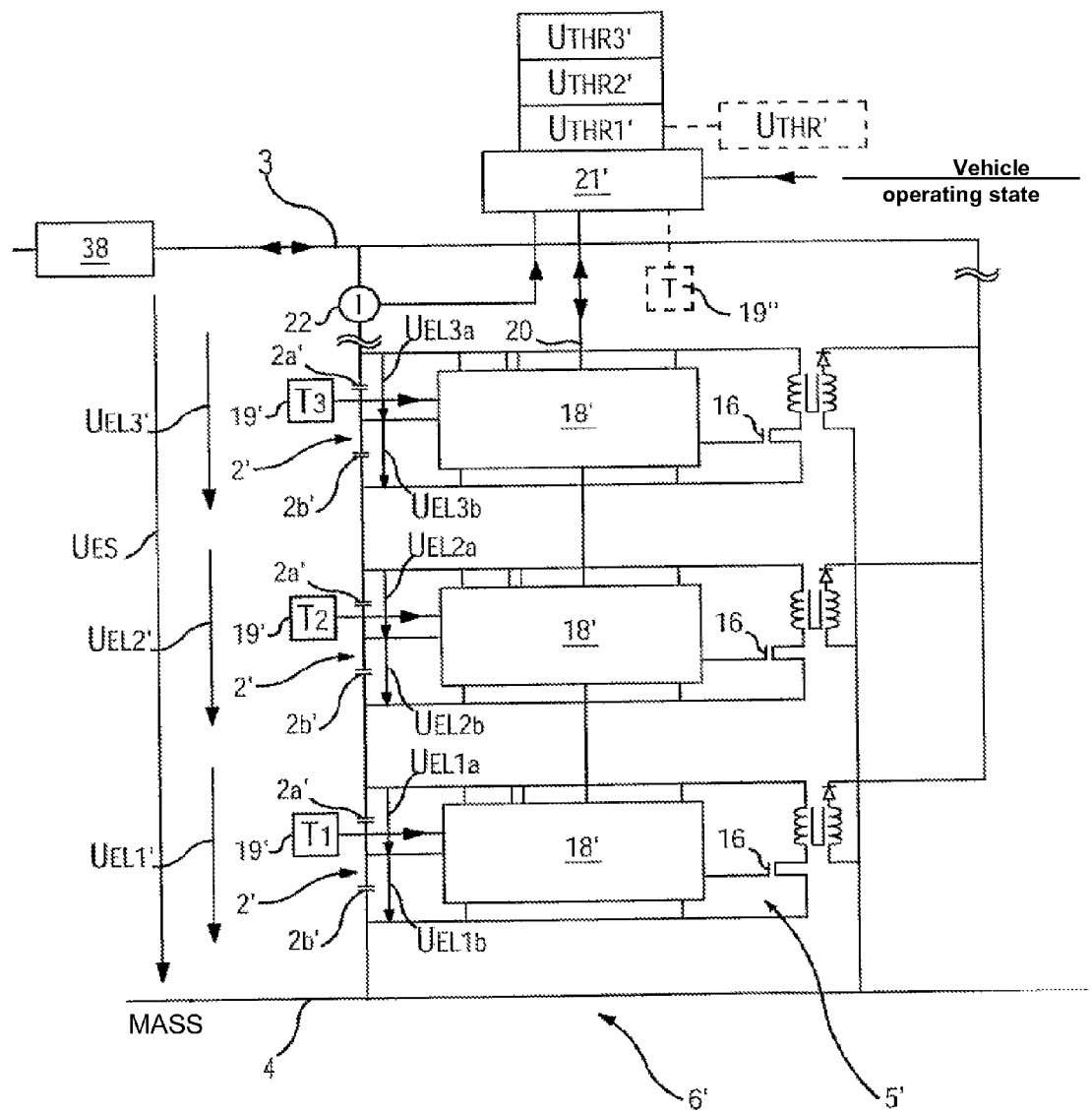
FIG. 3 shows circuit diagrams of another embodiment of an energy storage unit, in which pairs of storage elements are respectively combined to form a storage element group.
Figure 3B:
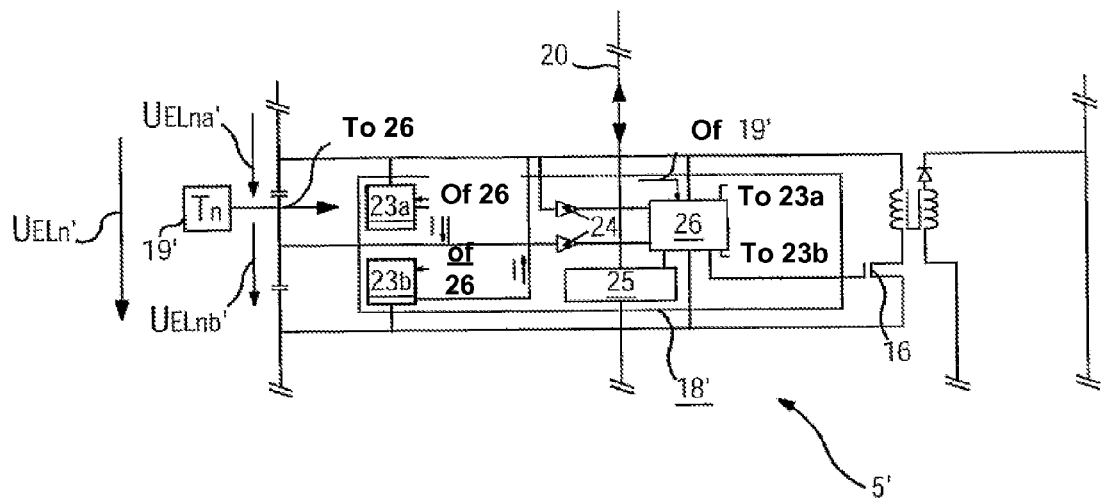
Figure 3C:
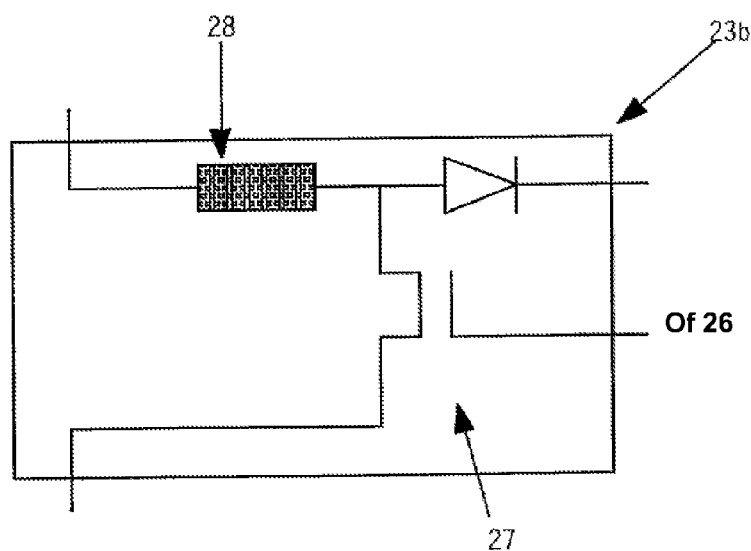

FIGS. 3a-c show another embodiment in which two storage elements which are switched in series (here labelled as 2a' and 2b') are in each case compiled to form a storage element group 2' in accordance with the older (not published) patent DE 102004062186. The individual voltages of the storage element 2a' and 2b' are labelled $U_{ELna}$' and $U_{ELnb}$', and the voltage of the storage element groups 2', which is the total of $U_{ELna}$' and $U_{ELnb}$', is labelled $U_{ELn}$'. If the storage element groups 2' in FIG. 3a are regarded as being analogous to the storage elements 2 shown in FIG. 2, the description relating to FIG. 2 also applies to the embodiments shown in FIG. 3. For example, in FIG. 3, the local control units 18' measure the voltages of the $U_{ELn}$' of the individual storage element groups 2'. In FIG. 3, the individual temperature sensors Tn' measure the shared temperature of the storage elements 2a', 2b' of the respective storage element group 2'. The local control units 18' report these values to the upstream control unit 21' as described above in relation to FIG. 2. This in turn determines on the basis of these input values (and if appropriate, other input values described above) either individual or uniform threshold values $U_{THRn}'$ or $U_{THR}'$, which in FIG. 3 relate to the voltages $U_{ELn}'$ of the storage element groups 2'. A specific voltage threshold value $U_{THRn}$ or $U_{THR}$ of the embodiment shown in FIG. 2, such as 2.25 V, thus corresponds with the embodiment shown in FIG. 3 to a voltage threshold value $U_{THRn}'$ or $U_{THR}$ specified by the upstream control unit 21' which is double as high, i.e. 4.5 V, for example.

The charge redistribution functions in the same way as for FIG. 2. In other words, when the measured current voltage $U_{ELn}'$ of one or more storage element groups 2' lies above the voltage threshold value $U_{THRn}'$ or $U_{THR}'$ specified by the upstream control unit 21', the local control unit 18' causes charge to be removed from the corresponding storage element group 2'. For this purpose, the local control unit 18' (by means of a microcontroller 26, FIG. 3b) cycles the power switch 16, so that charge is removed from the storage element group 2' in question, and is fed to the other storage element groups 2'.

In general, asymmetries can also be formed in the charging state between the two storage elements 2a', 2b' within a storage element group 2'. In order to avoid asymmetries of this nature, the local control unit 18' of the embodiment shown in FIG. 3 is designed to symmeterise the individual voltage $U_{ELna}'$ and $U_{ELnb}'$ within the respective storage element group 2'. For this purpose, an additional voltage tap is provided between the individual storage elements 2a', 2b', which makes it possible in the respective local control unit 18' not only to measure the voltage $U_{ELn}'$ of the respective storage element group 2', but also the voltages $U_{ELna}'$ and $U_{ELnb}'$ of the individual storage elements 2', 2b'. If one of the individual voltages $U_{ELna}'$ or $U_{ELnb}'$ exceeds half of the threshold value $U_{THn}'$ or $U_{THR}'$ specified by the upstream control unit 21', the local control unit 18' removes charge from this storage element (e.g. 2a') and diverts it to another storage element (e.g. 2b') of the affected storage element group 2' until the threshold value $U_{THRn}'/2$ or $U_{THR}'/2$ (and if appropriate an additional hysteresis value) is no longer reached.

In order to achieve this charge redistribution within the group, the local control unit 18' has the substructure shown in FIG. 3b, for example. This substructure comprises two voltage converters 23a, 23b, two voltage measurement amplifiers 24, a communication interface 25 and the aforementioned microcontroller 26. Since the voltage converters 23a, 23b are used for redistributing the charge within the group of the storage elements 2a', 2b', they are also referred to below as "storage element converters". The storage element converter 23a, 23b of a storage element 2a', 2b' is connected with its output with the positive connection of the respective other storage element 2b' or 2a'. The storage element converters 23a, 23b are for example choke converters, wherein the upper storage element converter 23a is for example a voltage reducing converter, and the lower storage element converter 23b is for example a voltage increasing converter. An exemplary circuit for a voltage reducing choke converter 23b is shown schematically in FIG. 3c. In a similar manner as for the charge redistribution units 5 described in relation to FIG. 2, with the storage element converters 23a, b, charge is removed from the respective corresponding storage element 2a', 2b', in which in each case, a power switch 27 is activated in a cyclical manner. Through self-induction in a choke 28, this causes a current to flow when the voltage is increased or reduced. The switch 27 is triggered in a similar manner to the switch 16 by the microcontroller 26. A corresponding circuit for the voltage reducing choke converter 23b can be obtained for example in FIG. 3c essentially by interchanging the switch 27 and the choke 28.

Figure 4:
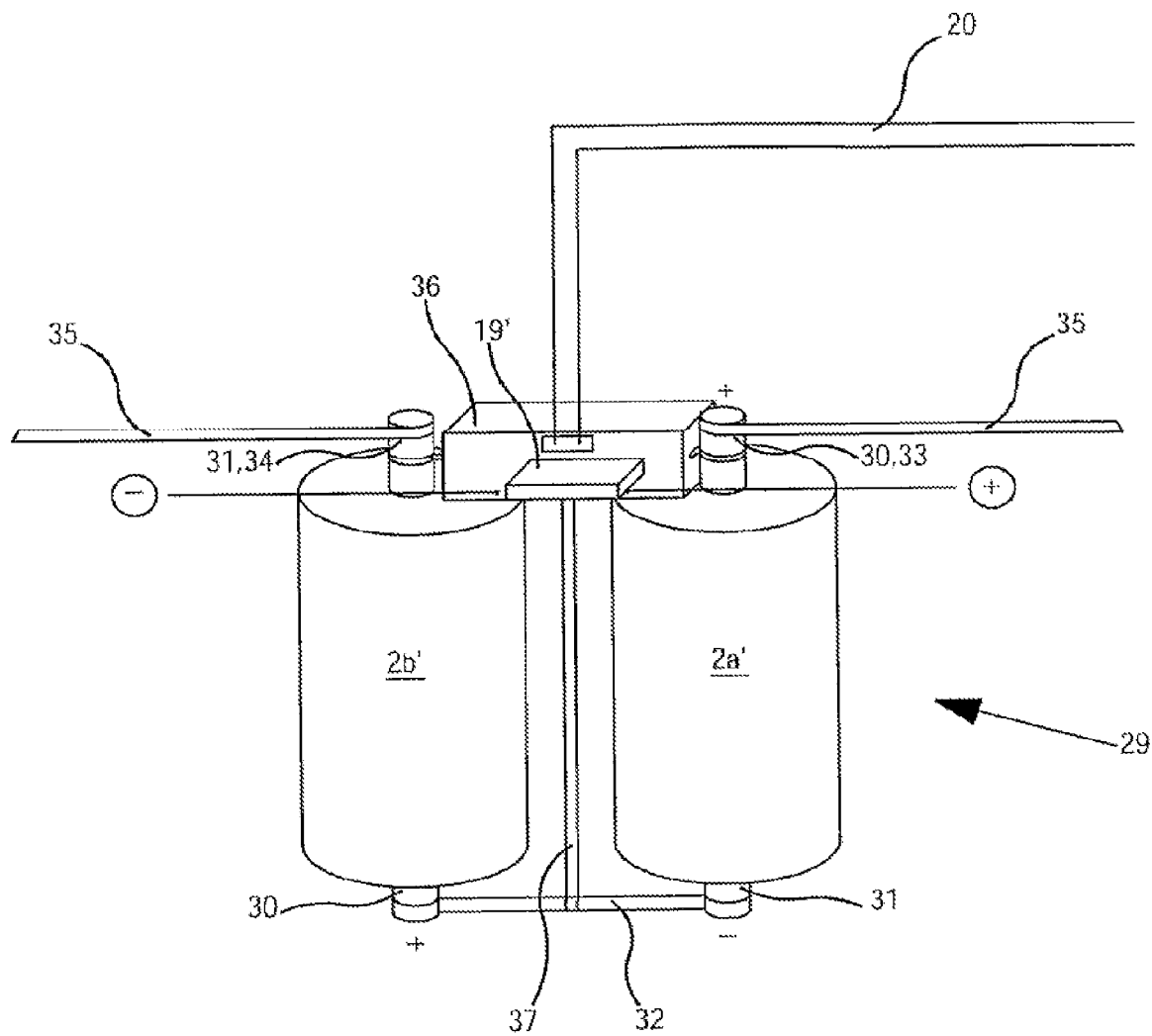
FIG. 4 shows a spatial view of an exemplary twin arrangement of the two storage elements of a storage element pair from FIG. 3.

FIG. 4: Twin Arrangement

FIG. 4 shows a twin arrangement 29 of two storage elements 2a', 2b'. These are typically double-layer capacitors, the housing of which has an elongated, cylindrical form with two e.g. circular front sides. The two storage elements 2a', 2b' are arranged in parallel with longitudinal axes of the housing cylinder which lie on a shared plane. On the longitudinal axes, the storage elements 2a', 2b' have a positive current connection 30 or a negative current connection 31 on the respective opposite front sides. The storage elements 2a', 2b' are with respect to their polarities arranged with an opposite orientation, i.e. on the adjacent front sides, a positive current connection 30 of the one storage element and a negative current connection 31 of the other storage element is provided in each case. On one side, the two adjacent current connections 30, 31 are coupled with a connection line 32. The two storage elements 2a', 2b' thus together form a storage element group 2' in FIG. 3. The current connections 30 or 31 on the other side form the positive or negative connection terminal 33 or 34 of this group 2'. They are in each case connected with further twin arrangements of the same type via connection strips 35. Between the two aforementioned connection terminals 33, 34, the charge redistribution unit 5' (FIG. 3) belonging to the group 2' is arranged in a housing 36. The housing 36 also holds the temperature sensor 19' in such a manner that it is in heat conducting contact with both storage elements 2a', 2b'. The charge redistribution unit in the housing 36 is, as has been explained above with reference to FIG. 3, connected with the two connection terminals 33, 34 of the storage element pair 2', and also has a tap 37 to the potential between the two storage elements 2a', 2b' e.g. by contacting the connection line 32. The charge redistribution unit in the housing 3b is also still connected with the positive and negative connection terminal of the entire energy storage unit, of which the storage element group 2' under consideration is a part. In addition, as a communication connection, it is coupled with the upstream control unit 21 via a control line 20.

FIG. 5: Charge Redistribution

FIG. 5 shows the charge redistribution function achieved with the embodiments according to FIGS. 2-4, using different voltage-time diagrams. On the vertical axis, the voltage $U_{ELn}$ is applied in each case, with the time t on the horizontal axis. In the diagrams, exemplary voltage progressions are shown in each case for three storage elements 2, labelled n=1, n=2, n=3, and one or more voltage thresholds $U_{THR}$ or $U_{THRn}$. Each voltage threshold has one hysteresis.

Figure 5A:
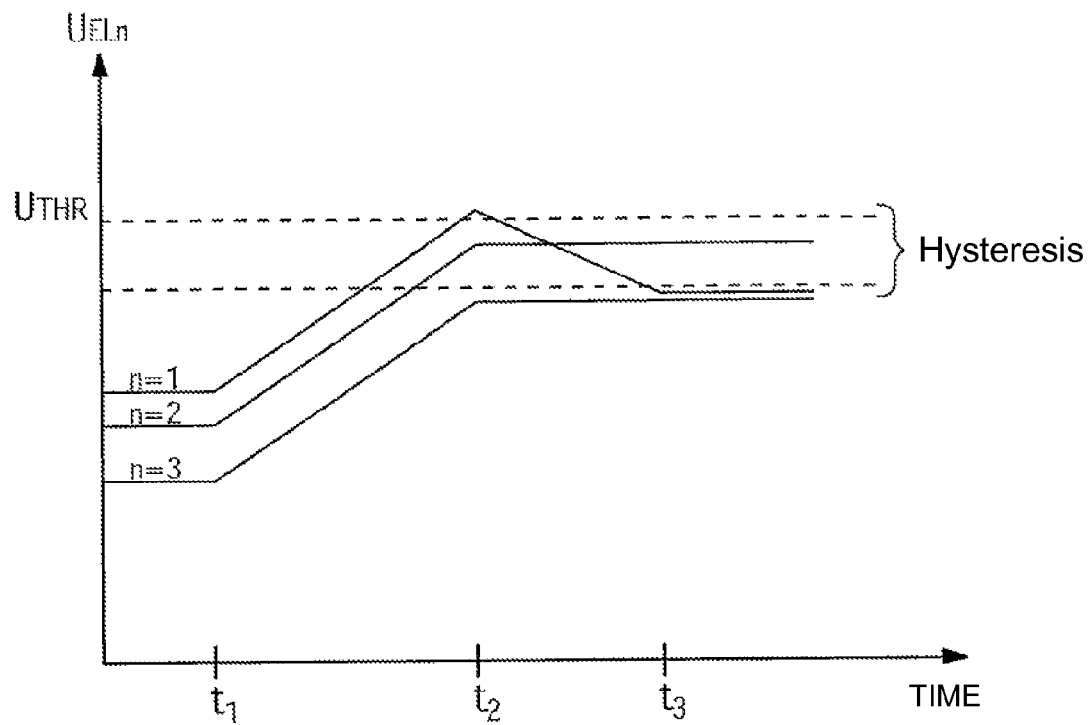
FIG. 5 shows diagrams which clarify the charge redistribution function.

FIG. 5a shows a first exemplary case, in which the voltage threshold value $U_{THR}$ is exceeded in the course of a charging process. Here, with the example shown in FIG. 5a, this should be a uniform threshold value for all storage elements.

Already in the initial state, the different storage elements have different voltages, with the highest of the three voltages initially being the voltage $U_{EL1}$, the middle voltage being $U_{EL2}$ and the lowest voltage being $U_{EL3}$. These voltage differences which are already present initially arise e.g. from previous charging and discharging processes; the general tendency to form charge asymmetries of this nature has already been explained above. At timepoint $t_1$, a charging process now begins which causes the voltages $U_{ELn}$ of all three storage elements to increase at approximately the same rate. At timepoint $t_2$, the voltage of the highest storage element, $U_{EL1}$, exceeds the voltage threshold value $U_{THR}$ specified by the upstream control unit. When the threshold is exceeded in this way, the redistribution process already mentioned above begins in such a manner that from the storage element n=1 charge is removed, and this charge is fed to the other storage elements. For purposes of simplicity, it is assumed in FIG. 5 that when the threshold $U_{THR}$ is exceeded, the charging process is also terminated, so that in FIG. 5a, from $t_2$, only the effect of the charge removal can be shown (in general, the charging process could however also continue after $t_2$, so that in a competitive manner, the storage element n=1 would be fed a charge due to the charging process, and charge would be removed from it due to the redistribution process). As a result of this, the voltage $U_{EL1}$ of the storage element n=1 affected by the redistribution process is reduced, whereas in contrast, the voltages $U_{EL2}$ and $U_{EL3}$ of the other storage elements remain approximately constant (more precisely, these voltages increase slightly, since the charge removed from the storage element n=1 is fed to the other storage elements—when the number of other storage elements is relatively high, however, a relatively strong dilution effect occurs, so that the voltage increase of the other storage elements cannot be detected in the degree of precision of the drawing shown in FIG. 5). At the timepoint $t_3$, the reducing voltage $U_{EL1}$ reaches the reduced voltage threshold value around the hysteresis, at which point the redistribution process is ended, and the voltage $U_{EL1}$ now also remains constant.

Figure 5B:
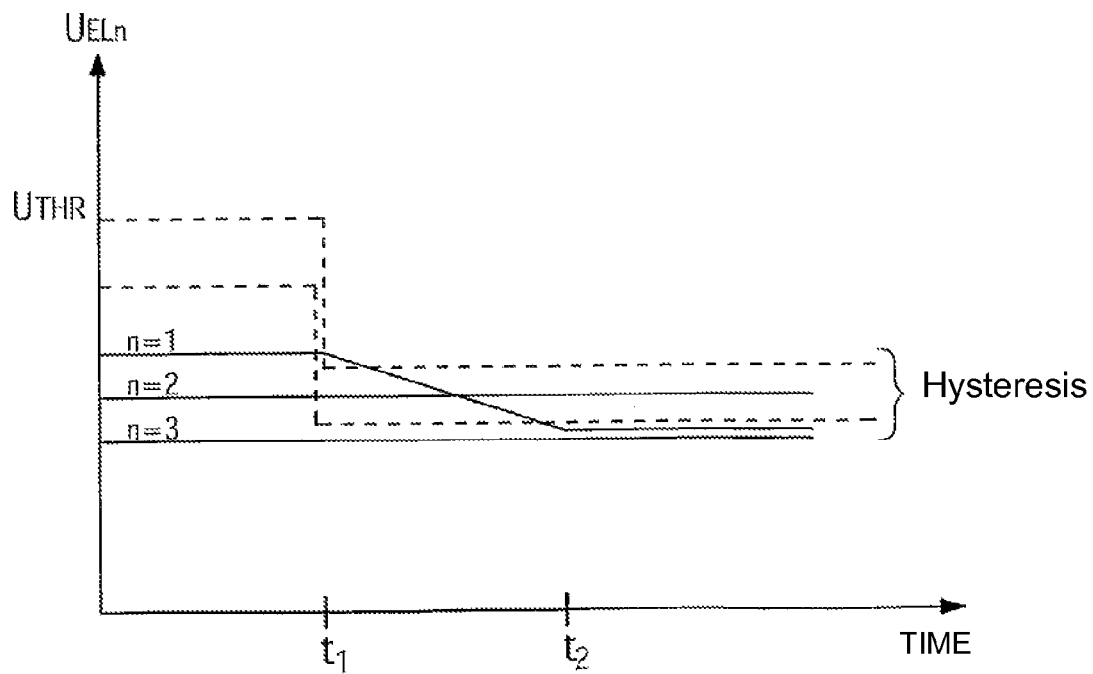

FIG. 5b shows a similar case, in which the threshold value is not exceeded as a result of a charging process, however, but by a reduction in the threshold value $U_{THR}$. The initial state corresponds to that shown in FIG. 5a. At the timepoint $t_1$, the threshold value $U_{THR}$ is reduced by the upstream control unit 21. As has already been explained, and as will be explained in greater detail below, this can for example be caused by a corresponding increase in the temperature of the storage elements, or by a change in the vehicle operating state. As a result of the change in threshold, the higher voltage value $U_{EL1}$ now exceeds the threshold value $U_{THR}$, while the other voltage values, $U_{EL2}$ and $U_{EL3}$, remain below the reduced threshold value $U_{THR}$. As with FIG. 5a, the redistribution process begins when the threshold value is exceeded (here at $t_1$) for the exceeding storage element n=1, so that its voltage $U_{EL1}$ is reduced. The voltages $U_{EL2}$ and $U_{EL3}$ of the other storage elements remain the same, however—within the degree of precision of the drawing. At $t_2$, the voltage $U_{EL1}$ falls below the threshold value $U_{THR}$ together with the hysteresis, so that the redistribution process ends and the voltage $U_{EL1}$ now remains constant.

Figure 5C:
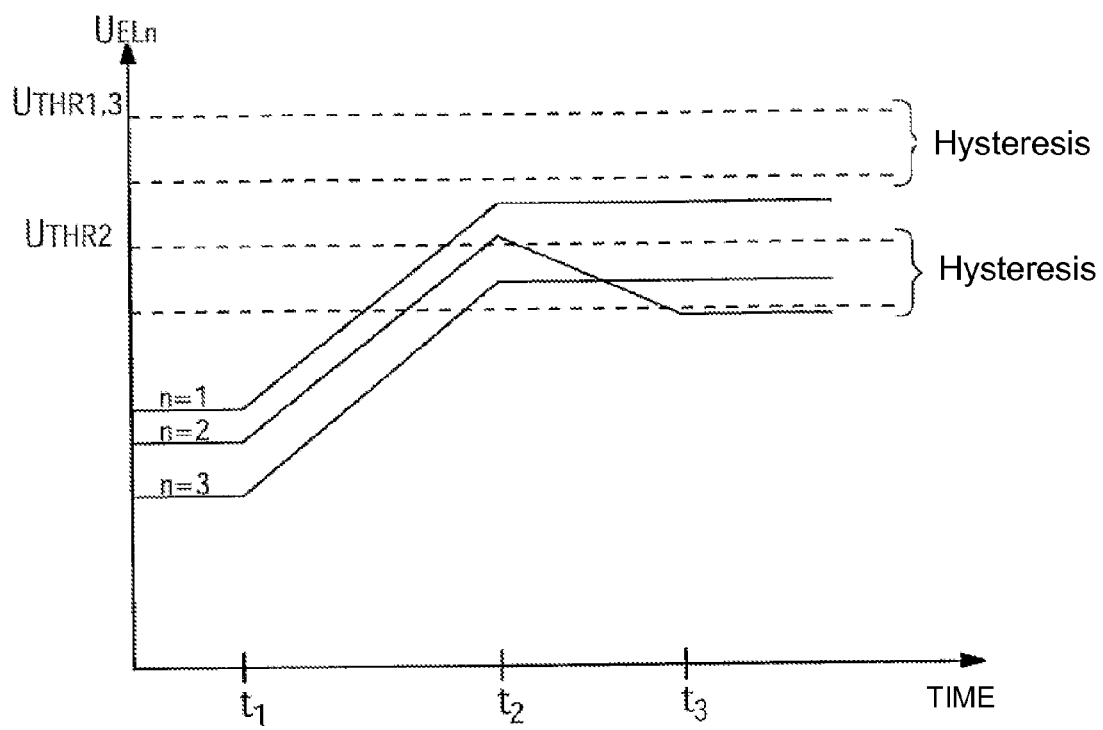

FIG. 5c shows a case similar to FIG. 5a, but with an embodiment with voltage threshold values for individual storage elements. In the example given in FIG. 5c, the threshold value for the storage element n=2 (i.e. the threshold value $U_{THR2}$) is lower than the threshold values $U_{THR1}$ and $U_{THR3}$ for the other storage elements. The initial state of the voltages $U_{ELn}$ assumed in FIG. 5c corresponds to that in FIG. 5a. At timepoint $t_1$, a charging process now begins which at $t_2$ causes the threshold value to be exceeded. Since in the example given in FIG. 5c, the threshold value $U_{THR2}$ is significantly lower than the other threshold values, here, the storage element n=2 with its voltage $U_{EL2}$ exceeds the threshold value, while the voltages $U_{EL1}$ and $U_{EL3}$ do not exceed their thresholds $U_{THR1}$ and $U_{THR3}$. As a result, at $t_2$, the redistribution process begins for the storage element n=2, which (assuming a simultaneous termination of the charging process as in FIG. 5a) leads to a reduction in the voltage $U_{THR2}$. The voltages $U_{THR1}$ and $U_{THR3}$ remain approximately constant, however. At $t_3$, the voltage $U_{EL2}$ falls below the corresponding threshold value $U_{THR2}$ together with the hysteresis, so that at this timepoint, the redistribution process is terminated. The lower threshold value $U_{THR}$ can for example be caused by the fact that the storage element n=2 has a higher temperature or a higher effective age than the other storage elements.

Figure 5D:
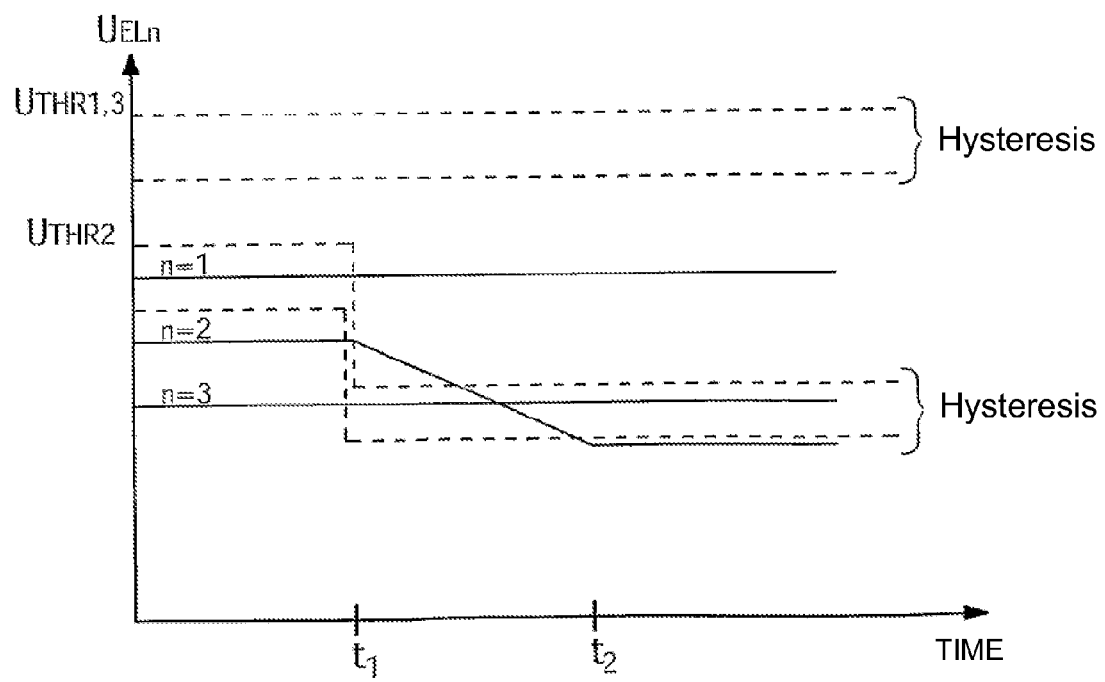

FIG. 5d shows a case with threshold values for individual storage elements, similar to FIG. 5c, but where the threshold values are exceeded not by a charging process however, but—similar to in FIG. 5b—by a reduction in the threshold value. In the initial state, all three thresholds, $U_{THR1}$, $U_{THR2}$ and $U_{THR3}$ are set at approximately the same value. At timepoint $t_1$, one of these thresholds, namely $U_{THR2}$, is now reduced by the upstream control unit. A selective reduction of this nature can for example be caused by a specific temperature increase in the corresponding storage element n=2, or by the recognition that this storage element is particularly advanced in age. Due to the fact that the threshold value is exceeded by $U_{EL2}$ when the threshold value is reduced, the charge redistribution process begins for the storage element n=2, which is again terminated when the threshold value/hysteresis is no longer reached, in accordance with FIGS. 5b and 5c.

Figure 6:
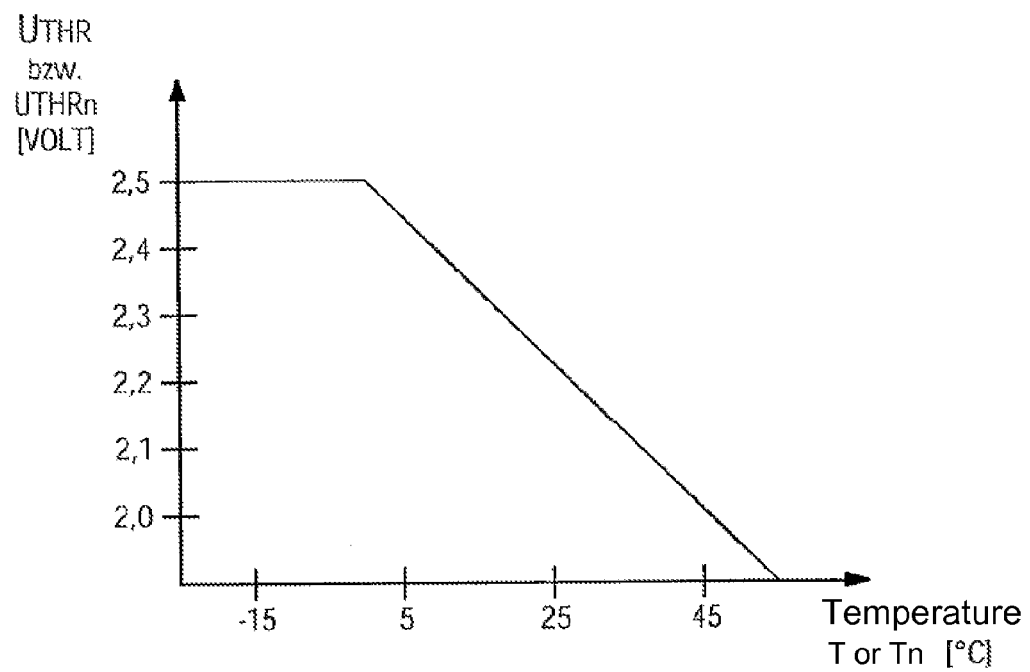
FIG. 6 shows schematically using a diagram how with some embodiments, the voltage threshold value is varied depending on the temperature.

FIG. 6: Threshold as a function of temperature

FIG. 6 shows as an example how the specified voltage threshold value specified by the upstream control unit is varied in dependence on the temperature. The combination shown applies equally to the temperature dependence of the uniform threshold $U_{THR}$ and the thresholds for the individual storage elements $U_{THRn}$, which are used depending on the embodiment. In the first case, the progress of the voltage threshold shown relates to a shared temperature T of the storage unit and in the last case, to an individual temperature $T_n$ of an individual storage element 2 (FIG. 2), or of an individual storage element group 2' (FIG. 3). The dependence is such that the voltage threshold value $U_{THR}$ or $U_{THRn}$ increases as the temperature T or $T_n$ increases, and in such a manner that a specific working life of the storage elements is achieved; with the example shown in FIG. 6, this is a working life of 10 years. The increase in the voltage threshold value $U_{THR}$ or $U_{THRn}$ can also be restricted to a specific maximum value, e.g. 2.5 V. The combination shown in FIG. 6 is with some embodiments stored in the form of e.g. a table in the upstream control unit 21. This determines the threshold value $U_{THR}$ or $U_{THRn}$ in dependence on the measured or determined temperature T or $T_n$ from the table, and supplies it to the local control unit 18.

Figure 7:
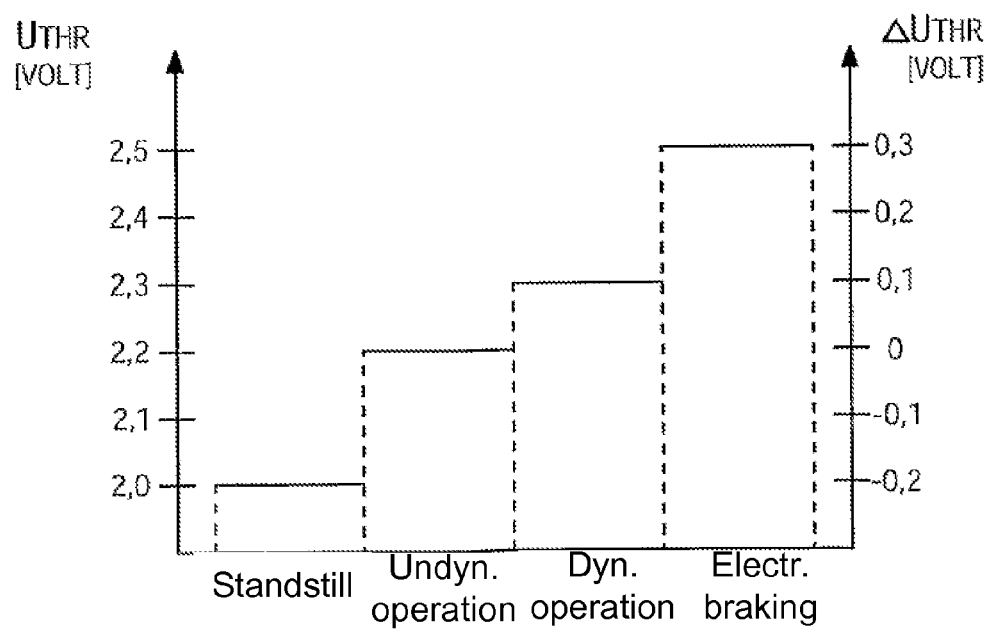
FIG. 7 shows schematically the dependence of the voltage threshold value with some embodiments on the motor vehicle operating state.

FIG. 7: Threshold as a Function of the Vehicle Operating State

In a similar manner, FIG. 7 shows the dependence of the voltage threshold on the vehicle operating state. With some embodiments, this dependence alone is given, i.e. without the temperature dependence shown in FIG. 6. In relation to these embodiments, the left vertical axis shown in FIG. 7 gives absolute values $U_{THR}$ for the voltage threshold. With other embodiments, the dependence of the voltage threshold on the vehicle operating state shown in FIG. 7 is overlaid over the temperature dependence shown in FIG. 6; for these embodiments, the right vertical axis in FIG. 7 gives change values $\Delta U_{THR}$. These are—depending on their preliminary sign—to be added to or subtracted from the voltage threshold value $U_{THR}$ or $U_{THRn}$ shown in FIG. 6. Since the difference operating states affect all storage elements 2 or storage element groups 2' of the energy storage unit 1 in the same manner, in FIG. 7, only a dependence of the entire voltage threshold value $U_{THR}$ or a shared threshold change is shown, but not individual voltage threshold values or individual changes to voltage threshold values.

In the example given in FIG. 7, a difference is made between four operating states, namely standstill, undynamic mode (e.g. driving on the motorway), dynamic mode (e.g. urban traffic) and electric braking. The "undynamic mode" operating state is here regarded to a certain extent as being the normal state, with which no change to the otherwise determined (e.g. temperature-dependent) voltage threshold value should be connected. At a standstill, however, the voltage threshold value is significantly reduced for the purpose of extending the working life, e.g. by 0.2 V in the example shown in FIG. 7. By contrast, in dynamic mode and, even more strongly, during electric braking, it is increased for the purpose of raising the storage capacity level, with a rise by 0.1 V in dynamic mode and by a further 0.2 V during electric braking.

FIG. 8: Setting the Threshold in Order to Equalise the Ageing Process

Figure 8A:
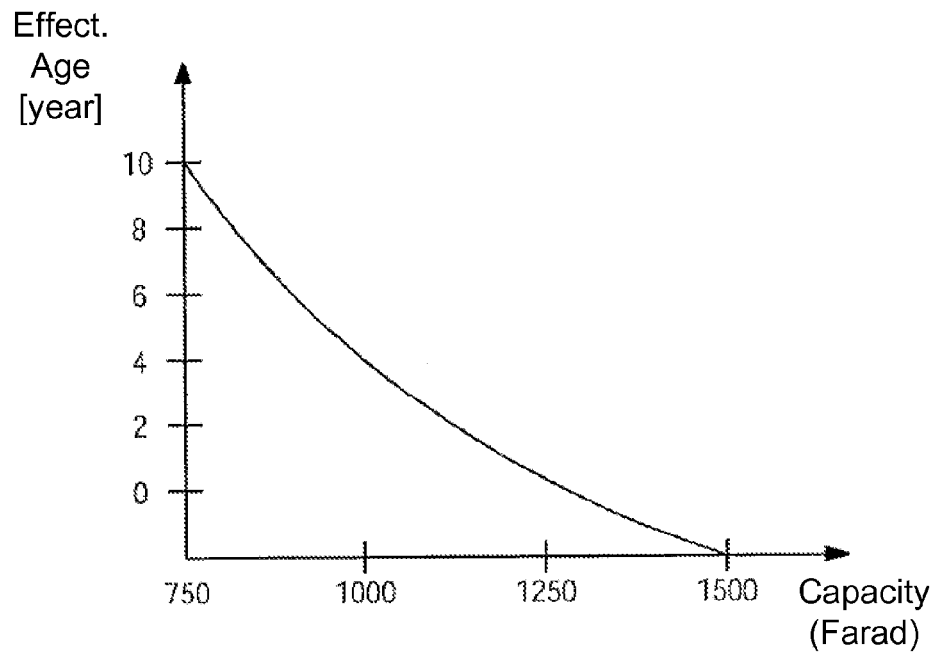
FIG. 8 shows an asymmetrical threshold setting with some embodiments in order to achieve slower ageing of storage elements which are already above the average age.

FIG. 8 shows an asymmetrical threshold setting as conducted with some embodiments i order to achieve a slower ageing process for storage elements which are already above the average age. FIG. 8*a* initially shows how for example the capacity of a storage element such as a double-layer capacitor is reduced as its age increases, and thus also shows how a conclusion is reached regarding the effective age of a storage element by determining the capacity. In the combination shown in FIG. 8*a*, it has been assumed, for example, that the basic storage element is operated at such voltages that it reaches the end of its working life after approximately 10 years. As has been described above, the upstream control unit 21 calculates the capacity by measuring the charge/discharge flow and the resulting change in voltage. The age of the individual storage elements can then be calculated in each case from the combination shown in FIG. 8*a*.

As has already been described above, a premature ageing of individual storage elements normally would normally lead to a premature failure of the energy storage unit which would correspond to this premature ageing. Premature ageing of this nature is shown on the horizontal axis in FIG. 8*b* as the difference between the effective age of a storage element and the average age of all storage elements in the energy storage unit.

Figure 8B:
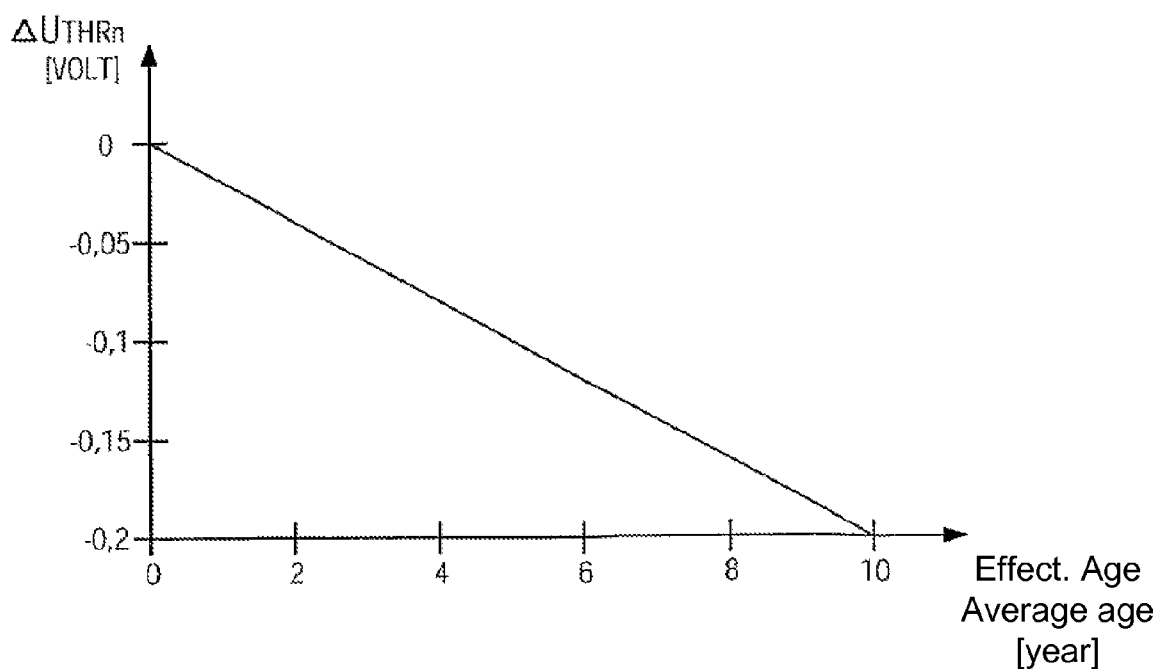

FIG. 8*b* shows as an example the differential value $\Delta U_{THRn}$ by which the voltage threshold value of an observed storage element n is reduced in dependence on its premature ageing in order to delay the further ageing of this storage element so that the age of the storage elements are equalised and the working life of the energy storage unit overall is thus increased. As is shown in FIG. 8*b*, no reduction of this type of the voltage threshold value occurs with average ageing. As can be seen for example in FIG. 1, with the storage elements observed here, such as double-layer capacitors, a voltage reduction of 0.2 V leads to an extension of working life from one year to approximately 10 years. Thus, according to FIG. 8*b*, the voltage threshold value is reduced by approximately 0.2 V when an observed storage element is effectively already 10 years older than the average age of the storage elements. The upstream control unit 21 determines the effective age of all storage elements and the average age, calculates the difference between the effective age and the average age for each storage element from this, subsequently determines with the stored combination in the upstream control unit 21 in FIG. 8*b* the reduction in threshold value $\Delta_{UTHRn}$ for each storage element, and accordingly transmits to the local control units 18 reduced voltage threshold values $U_{THRn}$ for each individual storage element.

Figure 9:
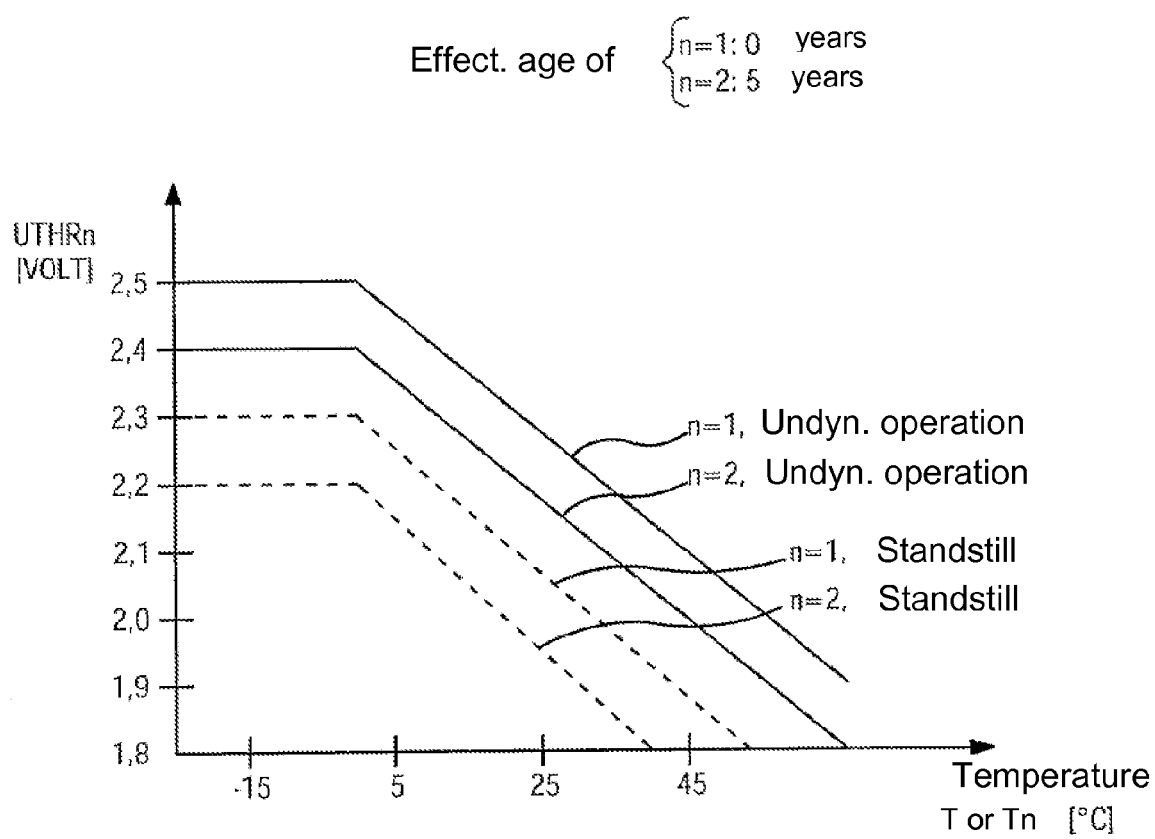
FIG. 9 shows the dependence of threshold values on the temperature in a similar manner to FIG. 6, but additionally depending on the motor vehicle operating state according to FIG. 7 and the age of the storage elements according to FIG. 8.

FIG. 9: Combination of these Threshold Dependencies

FIG. 9 shows the temperature dependence of the voltage thresholds according to FIG. 6, but now additionally with the dependence on the vehicle operating state shown in FIG. 7 and the dependence on the individual age of the individual storage elements shown in FIG. 8. A first storage element, n=1, is not yet aged in the example shown in FIG. 9, i.e. it has an age of "0 years". For the "undynamic mode" operating state, its threshold value temperature curve corresponds to that shown in FIG. 6. By contrast, a second storage element, n=2 is in the example shown in FIG. 9 already strongly aged, already having an effective age of five years. According to FIG. 8*b*, the threshold value temperature curve of the storage element n=2 is thus displaced to a lower voltage by e.g. 0.1 V.

FIG. 9 shows with a broken line the same voltage threshold temperature curves for another vehicle operating state, i.e. the "standstill" operating state. According to FIG. 7, here, the voltage threshold temperature curves are displaced by 0.2 V to lower values as opposed to the "undynamic mode" operating state.

Figure 10:
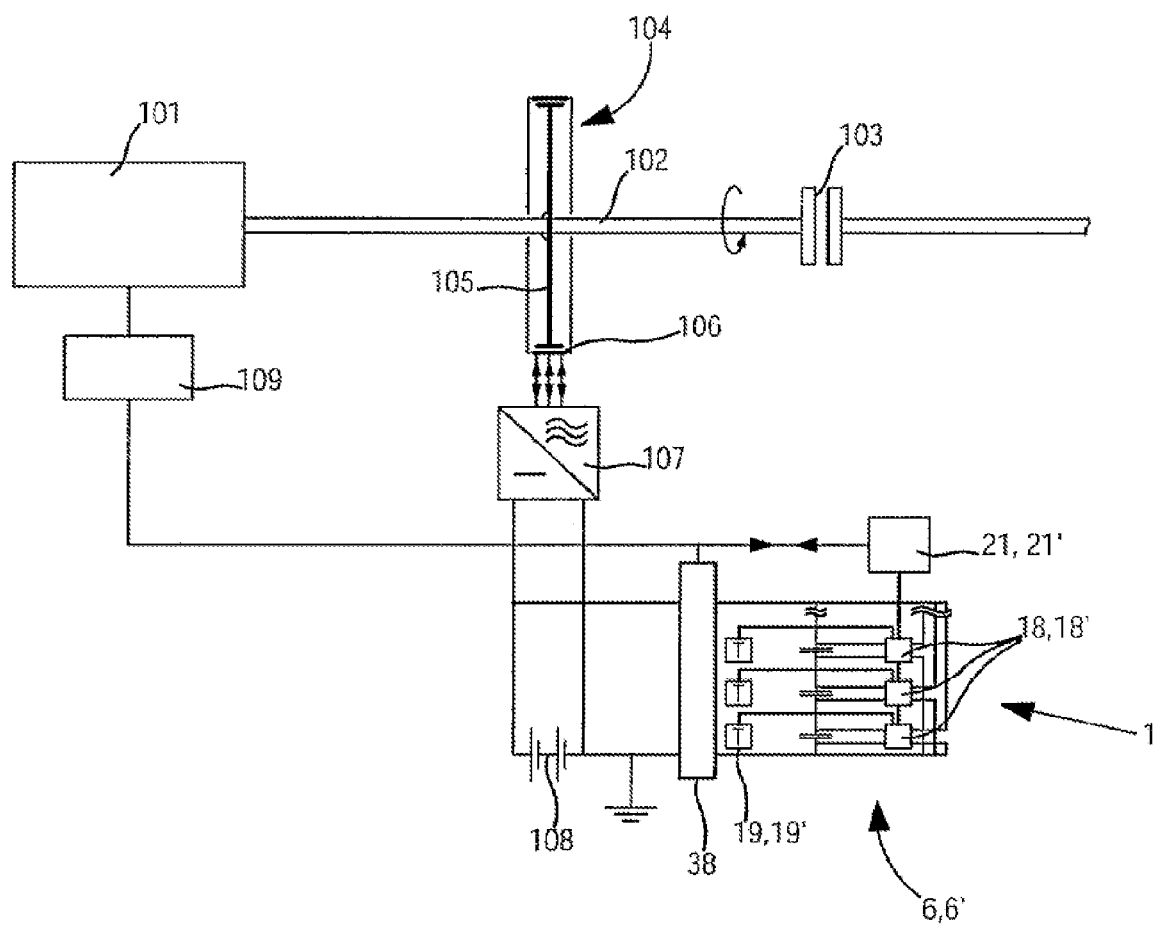
FIG. 10 shows a schematically simplified view of a motor vehicle drive system with an embodiment of the energy storage unit described.

FIG. 10: Drive System with Energy Storage Unit

FIG. 10 shows a motor vehicle drive system with an energy storage unit 1 and a charge redistribution circuit 6 in accordance with FIG. 2-9. The drive system comprises a combustion engine 101, which transmits a torque via a drive shaft 102 (e.g. the crankshaft of the combustion engine 101), a clutch 103 and further parts (not shown) of a drive chain onto the drive wheels of the vehicle. An electric machine 104 sits on the drive shaft 102 which acts as a drive support (booster) and as a recuperation brake, here a rotary current asynchronous machine or for example a rotary current synchronous machine equipped with permanent magnets. This can be switched between engine and generator mode. As a booster and, if appropriate, as a starter of the combustion engine, it operates in engine mode, while as a recuperation brake and if appropriate as a generator for feeding consumers and charging energy storage units, it operates by contrast in generator mode. The electric machine 104 comprises a stand 106 which sits directly on the drive shaft 102 and which is supported with torsional strength with rotors 105 to which it is connected, and which is supported e.g. on the housing of the combustion engine 101. The electric machine 104 and the combustion engine 101 run permanently together; the combustion engine 101, the boost function, the recuperation brake function and/ or the generator function are started directly and without transmission. The winding (not shown here) of the stand 106 is fed by an inverse rectifier 107 with electric currents and voltages of an amplitude, phase and frequency which can be freely set as required. The inverse rectifier 107 generates these currents and voltages from a direct current input circuit, in which a standard long-time battery 108 (e.g. a lead sulphuric acid storage battery) is arranged. With the input circuit, the energy storage unit 1 is also connected with the charge redistribution circuit 6 via a charging/discharging control device 38. The energy storage unit 1 is, as has been shown in greater detail in FIGS. 2 and 3, structured from storage elements 2 which are switched in series or storage element groups 2'. When the electric machine 104 briefly has a high electric power requirement, such as when adding torque when the vehicle accelerates (boost function), a high level of electric power is briefly removed from the energy storage unit 1 and fed to the electric machine 104 via the inverse rectifier 107. In the reverse direction, electric energy with a high level of power is stored when the vehicle brakes, when the electric machine 104 briefly converts a high level of mechanical power into electric power, and feeds this via the inverse rectifier 107 to the energy storage unit. Otherwise, the post-charging of the energy storage unit is conducted while operation is running, e.g. when the electric machine 104 acts as a generator to supply consumers etc. If the energy storage unit 1 is discharged e.g. after a longer standstill period, it can be charged during the start process from the long-time battery 108. During operation, the voltage thresholds are determined and the redistribution is conducted with the aid of voltage thresholds in accordance with the manner described above in relation to FIG. 2-9. The voltage thresholds are set by an upstream control unit 21, 21' in accordance with FIG. 2 or 3. For this purpose, initial information can be temperatures measured by temperature sensors 19, 19', ages of storage elements which have been determined and/or vehicle operating states which are supplied by a combustion engine control device 109 in accordance with the embodiments described above in relation to FIGS. 2-9. The charging/discharging control device 38 also obtains the temperature and/or operating state information in order to also charge and discharge the energy storage unit 1 overall in dependence on temperature and/or operating state.

The preferred embodiments make it possible to operate an energy storage unit consisting of several storage elements which are switched in series with a high overall degree of efficiency and in a manner which is maintained throughout its working life.

The invention claimed is:

1. An energy storage unit comprising:
two or more storage elements (2. 2') which are switched in series;
a charge redistribution circuit (6, 6'), which is installed in such a manner that a voltage of the storage element ($U_{ELn}$, $U_{ELn}'$) is measured and is compared with a voltage threshold value ($U_{THRn}$, $U_{THR}$, $U_{THRn}'$, $U_{THR}'$), wherein the charge redistribution circuit (6, 6') removes charge when the voltage threshold value ($U_{THRn}$, $U_{THR}$, $U_{THRn}'$, $U_{THR}'$), is exceeded by a storage element (2, 2') from said storage element (2, 2'), thus reducing its voltage ($U_{ELn}$, $U_{ELn}'$), and a storage related temperature determination is conducted and the voltage threshold value ($U_{THRn}$, $U_{THR}$, $U_{THRn}'$, $U_{THR}'$) is set variably in dependence on the determined temperature ($T_n$, T), so that as the temperature ($T_n$, T) increases, the voltage threshold value ($U_{THRn}$, $U_{THR}$, $U_{THRn}'$, $U_{THR}'$) is reduced; and
wherein the energy storage unit is for a motor vehicle which is equipped with an electric drive or an electric hybrid drive, wherein the voltage threshold value ($U_{THR}$, $U_{THR}$, $U_{THRn}'$, $U_{THR}'$) is also set variably in dependence on the current operating state of the vehicle, in such a manner that the threshold value ($U_{THRn}$, $U_{THR}$, $U_{THRn}'$, $U_{THR}'$) is set higher for relatively brief periods of time when the storage or removal requirement is relatively high.

2. An energy storage unit according to claim 1, wherein the charge removed from the storage element (2, 2') is fed to one or more storage elements (2, 2') of the energy storage unit (1).

3. An energy storage unit according to claim 1, wherein a shared voltage threshold value ($U_{THRn}$, $U_{THRn}'$) is used for the storage elements (2, 2') of the energy storage unit (1), and this shared voltage threshold value ($U_{THRn}$, $U_{THRn}'$) is set variably in dependence on the determined temperature (T).

4. An energy storage unit according to claim 3, wherein the determined temperature (T) is the shared temperature of the storage elements.

5. An energy storage unit according to claim 1, wherein individual storage elements (2) or groups (2') of storage elements are assigned individual voltage threshold values ($U_{THRn}$, $U_{THRn}'$), and these voltage threshold values ($U_{THRn}$, $U_{THRn}'$) are set variably so that they can be different for the individual storage elements (2) or groups (2') of storage elements, in dependence on the temperatures ($T_n$) determined for the elements (2) or groups (2') of storage elements.

6. An energy storage unit according to claim 5, wherein the determined temperatures ($T_n$, T) are measured temperatures of the individual storage elements (2) or groups (2') of storage elements.

7. An energy storage unit according to claim 1, wherein the storage elements (2, 2') can be at different stages of progression with respect to their age, which is installed so that the voltage of the storage element ($U_{ELn}$, $U_{ELn}'$) is measured and compared with a voltage threshold value ($U_{THRn}$, $U_{THRn}'$), wherein when the voltage threshold value ($U_{THRn}$, $U_{THRn}'$) is exceeded by a storage element (2, 2'), the charge redistribution circuit (6) removes charge from said storage element (2, 2'), thus reducing its voltage ($U_{ELn}$, $U_{ELn}'$), and wherein the voltage threshold value ($U_{THRn}$, $U_{THRn}'$) is set lower for storage elements (2, 2') with a relatively advanced age than for storage elements (2, 2') with a less advanced age.

8. An energy storage unit according to claim 7, wherein the voltage threshold value ($U_{THRn}$, $U_{THRn}'$) can more frequently be used in relation to the determined temperature ($T_n$, T) or vehicle operating state than in relation to the age of the storage elements.

9. An energy storage unit for a vehicle which is equipped with an electric drive or an electric hybrid drive, the energy storage unit comprising:
two or more storage elements (2, 2') which are switched in series; and
a charge redistribution circuit (6,6'), which is installed so that a voltage of the storage element ($U_{ELn}$, $U_{ELn}'$) is measured and is compared with a voltage threshold value ($U_{THRn}$, $U_{THR}$, $U_{THRn}'$, $U_{THR}'$), wherein when the voltage threshold value ($U_{THRn}$, $U_{THR}$, $U_{THRn}'$, $U_{THR}'$) is exceeded by a storage element (2, 2'), the charge redistribution circuit (6) removes charge from said storage element (2, 2') thus reducing its voltage ($U_{ELn}$, $U_{ELn}'$), and wherein the voltage threshold value ($U_{THRn}$, $U_{THR}$, $U_{THRn}'$, $U_{THR}'$) is set variably in dependence the current operating state of the vehicle in such a manner that the threshold value ($U_{THRn}$, $U_{THR}$, $U_{THRn}'$, $U_{THR}'$) is set higher for relatively brief periods of time when the storage or removal requirement is relatively high;
wherein the dependence on the current operating state of the vehicle is one or more of the following dependencies:
while the vehicle is in operation, the threshold value ($U_{THRn}$, $U_{THR}$, $U_{THRn}'$, $U_{THR}'$) is higher at standstill;
during operation with a frequently changing driving state, the threshold value ($U_{THRn}$, $U_{THR}$, $U_{THRn}'$, $U_{THR}'$) is higher than during operation with a more uniform driving state; and
during electrical regenerative braking and afterwards, the threshold value ($U_{THRn}$, $U_{THR}$, $U_{THRn}'$, $U_{THR}'$) is higher than when no electrical regenerative braking occurs.

10. An energy storage unit according to claim 1, wherein the charge redistribution circuit is operable to remove charge from a storage element when a voltage of said storage element exceeds the threshold value, such that said voltage of said storage element falls below said threshold value.

* * * * *